US008412643B2

(12) United States Patent
Lopez et al.

(10) Patent No.: US 8,412,643 B2
(45) Date of Patent: *Apr. 2, 2013

(54) APPARATUS, SYSTEM, AND METHOD FOR QUANTIFYING, BUNDLING, AND APPLYING CREDITS AND INCENTIVES TO FINANCIAL TRANSACTIONS

(75) Inventors: Teresa Lopez, Santa Fe, NM (US); James A. Baker, Santa Fe, NM (US)

(73) Assignee: EQS, Inc., Santa Fe, NM (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/400,739

(22) Filed: Mar. 9, 2009

(65) Prior Publication Data

US 2009/0228320 A1    Sep. 10, 2009

Related U.S. Application Data

(63) Continuation-in-part of application No. 12/347,741, filed on Dec. 31, 2008, now abandoned, and a continuation-in-part of application No. 12/347,818, filed on Dec. 31, 2008, now Pat. No. 8,266,076.

(60) Provisional application No. 61/034,898, filed on Mar. 7, 2008.

(51) Int. Cl.
*G06F 17/00* (2006.01)
*G06Q 30/00* (2012.01)
*G06Q 40/00* (2012.01)

(52) U.S. Cl. .................. 705/412; 705/14.34; 705/38

(58) Field of Classification Search .................. 705/412, 705/7.11, 7.12, 14.1, 14.11, 14.15, 14.17, 705/14.18, 14.19, 14.23, 14.34, 14.36, 14.39, 705/400, 29, 30, 34, 35, 38, 39, 40, 1.1

See application file for complete search history.

(56) References Cited

U.S. PATENT DOCUMENTS 3,908,899 A    9/1975    Millard

| 4,522,333 | A | 6/1985 | Blau et al. |
|---|---|---|---|
| 5,237,507 | A | 8/1993 | Chasek |
| 6,169,979 | B1 | 1/2001 | Johnson |
| 6,601,033 | B1 | 7/2003 | Sowinski |
| 6,868,293 | B1 | 3/2005 | Schurr et al. |
| 7,130,832 | B2 | 10/2006 | Bannai et al. |
| 7,133,750 | B2 | 11/2006 | Raines et al. |
| 2002/0110096 | A1 | 8/2002 | Carlsson et al. |
| 2002/0116239 | A1 | 8/2002 | Reinsma et al. |
| 2002/0120540 | A1* | 8/2002 | Kende et al. ............ 705/35 |

(Continued)

FOREIGN PATENT DOCUMENTS

JP    2001338028    12/2001

OTHER PUBLICATIONS

PCT/US2009/036580 International Preliminary Report on Patentability, Sep. 16, 2010.

(Continued)

*Primary Examiner* — Igor Borissov
(74) *Attorney, Agent, or Firm* — Kunzler Law Group, PC

(57) ABSTRACT

An apparatus, system, and method for quantifying, aggregating and bundling green incentives based on green construction enables applying at least a portion of the credits/incentives to financial transactions. Quantification includes estimating and/or monitoring usage of utilities, comparing the usage to a predetermined baseline value, and valuating an effectual energy savings that includes actual savings plus incentive values. Quantification relies on a database, which may include credits, deductions, and other green incentives data that contribute to the effectual savings. The effectual savings may be applied to early repayment of a mortgage loan, improved terms for the loan, investment in securities, and/or other trading. The method standardizes values of green incentives in energy units and/or monetary units. The method aids in qualifying the building projects based on a concrete estimation of the effectual energy savings. The method forms a bridge between green or sustainable/renewable technologies and the financial institutions and markets.

35 Claims, 11 Drawing Sheets

U.S. PATENT DOCUMENTS

| | | | |
|---|---|---|---|
| 2003/0023467 A1* | 1/2003 | Moldovan | 705/7 |
| 2003/0229572 A1 | 12/2003 | Raines | |
| 2004/0140908 A1 | 7/2004 | Gladwin et al. | |
| 2004/0158541 A1 | 8/2004 | Notarianni et al. | |
| 2005/0137921 A1 | 6/2005 | Shahriari | |
| 2005/0289051 A1 | 12/2005 | Allin | |
| 2006/0080246 A1 | 4/2006 | Wyckoff | |
| 2007/0094043 A1 | 4/2007 | Bannai et al. | |
| 2007/0150366 A1* | 6/2007 | Yahiro et al. | 705/26 |
| 2007/0250386 A1 | 10/2007 | Wyckoff | |
| 2008/0091590 A1 | 4/2008 | Kremen | |
| 2008/0172346 A1* | 7/2008 | Kremen et al. | 705/412 |
| 2008/0243658 A1* | 10/2008 | Clegg et al. | 705/35 |
| 2008/0270276 A1* | 10/2008 | Herzig | 705/35 |

OTHER PUBLICATIONS

U.S. Appl. No. 12/347,818 Office Action dated Oct. 20, 2011.
What is myEnergyLoan, http://www.myenergyloan.com/, know about as early as Nov. 1, 2007.
U.S. Appl. No. 12/347,818, Notice of Allowance, Apr. 10, 2012.

\* cited by examiner

APPARATUS, SYSTEM, AND METHOD FOR QUANTIFYING, BUNDLING, AND APPLYING CREDITS AND INCENTIVES TO FINANCIAL TRANSACTIONS

CROSS-REFERENCES TO RELATED APPLICATIONS

This application claims priority to U.S. Provisional Patent Application No. 61/034,898 entitled "APPARATUS, SYSTEM, AND METHOD FOR DETERMINING AND APPLYING A UTILITY SAVINGS TO A FINANCIAL TRANSACTION," filed on Mar. 7, 2008, a continuation-in-part of U.S. patent application Ser. No. 12/347,741 entitled "APPARATUS AND METHOD FOR DETERMINING AND APPLYING AN ENERGY SAVINGS TO A FINANCIAL TRANSACTION," filed on Dec. 31, 2008, and a continuation-in-part of U.S. patent application Ser. No. 12/347,818 entitled "APPARATUS, SYSTEM, AND METHOD FOR QUANTIFYING ENERGY USAGE AND SAVINGS," filed on Dec. 31, 2008 for Teresa Lopez et al., each of which is incorporated herein by reference.

BACKGROUND

1. Field

This invention relates to utility savings in building construction and more particularly relates to ways of using the savings.

2. Description of the Related Art

Builders who are concerned about the environment or who wish to save money have undertaken building projects designed to reduce the use of utilities, and in particular to reduce the consumption of nonrenewable energy. Generally, the benefits of such construction are well known.

Many building projects include improved or increased insulation. Others incorporate photovoltaic cells or wind generators. Technologically, consistently building energy-efficient or energy producing homes and offices is achievable. However, higher initial costs for such construction often dissuade builders and buyers from building more energy-efficient buildings. Typically, the buyer must bear the burden of the higher initial costs due to lack of financial incentives and a lack of financing programs that cover energy efficiency or energy producing enhancements. Furthermore, it is often unclear how much benefit such enhancements will provide, and how long it will take to recoup the extra initial cost. Thus, the higher initial costs and uncertainty regarding payback have presented significant barriers to more universal implementation of energy-efficient and energy producing systems in building projects.

SUMMARY

From the foregoing discussion, it should be apparent that a need exists for an apparatus, system, and method that offset higher initial costs by assurances of a payback with more definite terms. Beneficially, such an apparatus, system, and method would help to quantify or provide a valuation of a utility savings that is realized through incorporation of energy-efficient or energy producing systems. Another advantage made possible by such an apparatus, system, and method is the automatic application of a clearly quantified utility savings to one or more financial transactions that have a monetary value corresponding to the quantified savings.

The present invention has been developed in response to the present state of the art, and in particular, in response to the problems and needs in the art that have not yet been fully solved by currently available incentive programs, financing programs, and investment programs. Accordingly, the present invention has been developed to provide an apparatus, system, and method for determining energy savings and/or incentive credit(s) and applying those savings and/or credit(s) to a financial transaction in ways that are outside the realm of conventional incentive, financing, and investment programs. The apparatus, system, and method overcome some or all of the above-discussed shortcomings in the art.

Furthermore, an apparatus, system, and method for determining and applying a utility savings and/or incentive credit(s) to a financial transaction may include applying a portion of the utility savings and/or credit(s) to at least one of early repayment of a mortgage loan and investment in securities. The method may further include a request for the credit, and/or applying the credit to a financial transaction. The apparatus, system, and method enable issuance of mortgage loans for building projects that conserve or produce energy, where the mortgage loans have terms that are similar or better than conventional mortgage loans. The method standardizes energy units to a common unit and then converts the savings values of one or more utilities into a monetary value. The method also quantifies a savings of the utilities. Thus, the method helps to qualify the building project based on a particular amount or range of energy savings, for example. Thus, the apparatus, system and method form a bridge or nexus platform between green or energy sustainable technologies and the financial markets.

In a simple form, an apparatus for determining incentives for green construction in accordance with embodiments of the invention includes an analysis module that is configured to quantify respective values of at least one green incentive from a group of green incentives for one or more green construction projects. The apparatus also has a bundling module that is configured to group the values according to at least one party of interest. An execution module of the apparatus is configured to apply at least a portion of the values of at least one green incentive to at least one financial transaction on behalf of at least one party of interest. There may be a plurality of parties of interest including financial institutions, developers, utility companies, and building owners associated with green construction projects. The bundling module may be configured to group the values according to the respective parties of interest, and the execution module may be configured to apply the values of the green incentives to financial transactions involving the parties of interest.

In one aspect, the bundling module is configured to group the values for green construction projects that are associated with respective parties of interest for a specified geographic region. In conjunction with the bundling module, the apparatus may include a correlation module configured to correlate one or more green incentives to a plurality of green construction projects. The correlation module may be configured to selectively combine a plurality of the green incentives into a package, and the bundling module may in turn be configured to combine a plurality of packages into a bundle associated with the party of interest. The correlating and bundling in this manner are based on a retrofit construction and/or a new building construction that involves at least one of sustainable features and green features. In fact, the correlation module may be configured to correlate all green incentives that are available to the plurality of green construction projects. Examples of the green incentives include national tax credits, national tax deductions, state tax credits, state tax deductions, local tax credits, local tax deductions, municipal bonds, utility company buy backs, carbon credits, and renewable energy credits. The analysis module is configured to quantify a value of each of the green incentives that is available.

In one aspect, the execution module is configured to apply for the green incentive to one or more of a national government, state government, local government, carbon credit securities agency, and utility company. The execution module further includes a forms module that accesses at least one form with which to apply for the green incentive(s). The forms module accesses a plurality of forms corresponding to a respective plurality of recipients. The forms module may also be configured to automatically fill in at least a portion of the forms.

In one aspect, the apparatus includes a securities exchange module that is configured to apply for carbon credits based on carbon emissions reduction. The securities exchange module may be configured to enable purchase and sell of at least one of carbon credits, energy conserving incentive values, and energy generating incentive values.

In at least some of the embodiments, the analysis module is configured to determine a baseline value and compare a usage of at least one utility to the baseline value and calculate an energy savings. Then the analysis module can add the value of at least one green incentive to the energy savings for an effectual energy savings value. The execution module may be configured to apply at least a portion of the effectual energy savings value to financial transaction. In one aspect, the execution module applies the portion of the effectual energy savings to a plurality of payments from an escrow account.

In one aspect, at least one of the modules is configured to convert the value of the green incentive and a unit of usage for a utility into a single common unit of at least one of energy and currency.

In one aspect, the analysis module includes a modeling module that is configured to model reduced financial risk due to green incentive values in the model. The modeling module is also configured to illustrate an effectual energy savings to facilitate capital funding for at least one of retrofit construction and new build construction that includes at least one of sustainable features and green features. The modeling module illustrates cost outlays and utility spreads for at least one of break even and profit potential models. The modeling module may quantify a carbon load reduction for each of a plurality of buildings and calculate a total carbon load savings for the plurality of buildings. The carbon load calculation may be an actual savings or an estimate to determine a potential savings in a predetermined region.

In one aspect, the apparatus includes a mortgagor module. The mortgagor module includes at least a portion of one of the analysis module and the execution module. The mortgagor module is configured for setting terms of a loan and applying at least a portion of the value of the green incentive(s) to repayment of the loan.

In one aspect, the apparatus has a tax incentives module that is configured to identify, quantify, and apply for at least one tax incentive from among the green incentives. In any case, the apparatus may be an article of manufacture that includes a computer program storage medium readable by a processor and embodying one or more instructions executable by a processor to perform a method for determining at least one green incentive and applying at least a portion of the green incentive to a financial transaction. The method performed by the article of manufacture may include determining the at least one green incentive according to the instructions. The method may also include applying at least a portion of a value of the green incentive to a financial transaction, and any of a variety of other operations as described herein.

In another simple form, a method of quantifying a green incentive and applying the green incentive to a financial transaction in accordance with embodiments of the invention includes automatically quantifying respective values of at least one green incentive from a group of green incentives for one or more green construction projects. The method also includes automatically bundling the values of the at least one green incentive for the one or more green construction projects for at least one party of interest. The method also includes automatically applying at least a portion of the values of the at least one green incentive to at least one financial transaction on behalf of at least one party of interest.

In one aspect where there is a plurality of parties of interest, the method includes bundling the values according to the respective parties of interest. The parties of interest are associated with the green construction projects and are from the group that includes financial institutions, developers, utility companies, and real estate property owners. The method may further include applying the values of the green incentives to financial transactions involving the parties of interest.

In one aspect, the method includes selectively combining a plurality of the green incentives into a package, and bundling a plurality of packages into a bundle associated with the party of interest based on at least one of retrofit construction and new building construction that involves at least one of sustainable features and green features.

In one aspect, quantifying an energy usage includes determining an effectual energy savings by comparing the energy usage to a predetermined baseline and adding a quantified value of the at least one green incentive.

In another aspect, the method includes automatically correlating at least one green incentive to a plurality of green construction projects. Automatically correlating further includes correlating all green incentives that are available for the plurality of green construction projects. The green incentives are from the group that includes national tax credits, national tax deductions, state tax credits, state tax deductions, local tax credits, local tax deductions, municipal bonds, utility company buy backs, carbon credits, and renewable energy credits. In this aspect, automatically quantifying may further include quantifying a value of each of the green incentives that is available for each of the green construction projects.

In one aspect, automatically correlating includes receiving input through a user interface regarding the plurality of incentives. The operation of receiving input may include receiving input regarding the green incentives in one or more of a particular, city, state, country and region. The operation of receiving input, and any of the of the other operations of the method, may include receiving input or other operations under control of machine readable code physically embodied in storage media in a digital processing device.

In one aspect, the method includes applying for the green incentive to one or more of a national government, state government, local government, carbon credit securities agency, and utility company. Applying for the green incentive may include accessing one or more forms from among a plurality of forms, and applying for the green incentive with the form(s).

In one aspect, the method includes automatically charging a fee to the party or parties of interest for using the method. The parties of interest are from the group that includes financial institutions, developers, utility companies, and real property owners.

In any case, aspects of the method include absorbing an infrastructure cost for the green construction projects by applying at least a portion of the value of the green incentive to payment of the infrastructure cost.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. The invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above is set forth by reference to specific example embodiments that are illustrated in the appended drawings. These drawings depict only typical embodiments of the invention and are not to be considered limiting of the scope. Thus, embodiments of the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, the invention may be practiced without one or more of the specific details, or with other methods, components, materials, and so forth. In other instances, well-known structures, materials, or operations are not shown or described in detail to avoid obscuring aspects of the invention.

This disclosure sets forth building blocks to enable a new universal currency based on resource lending. While the focus of this disclosure is directed to green and renewable energy building construction, it is to be understood that the same principles, apparatuses, and methods can be applied in any industry. For example, loans for green automobiles may have improved terms for the consumer. Furthermore, lenders can benefit from tax credits, carbon credits, and other incentives. One way of benefiting lenders, such as large financial institutions, is by quantifying regional trading capacity. Alternatively or additionally, the automobile industry could reap some of the benefits of the green incentives available through application of the principles described herein. A study of this disclosure will reveal the building blocks for gaining access to as many incentives as are available for energy conserving and renewable energy producing ventures, and in reality this disclosure provides the building blocks for a universal currency for trading these incentive based assets.

Figure 1:
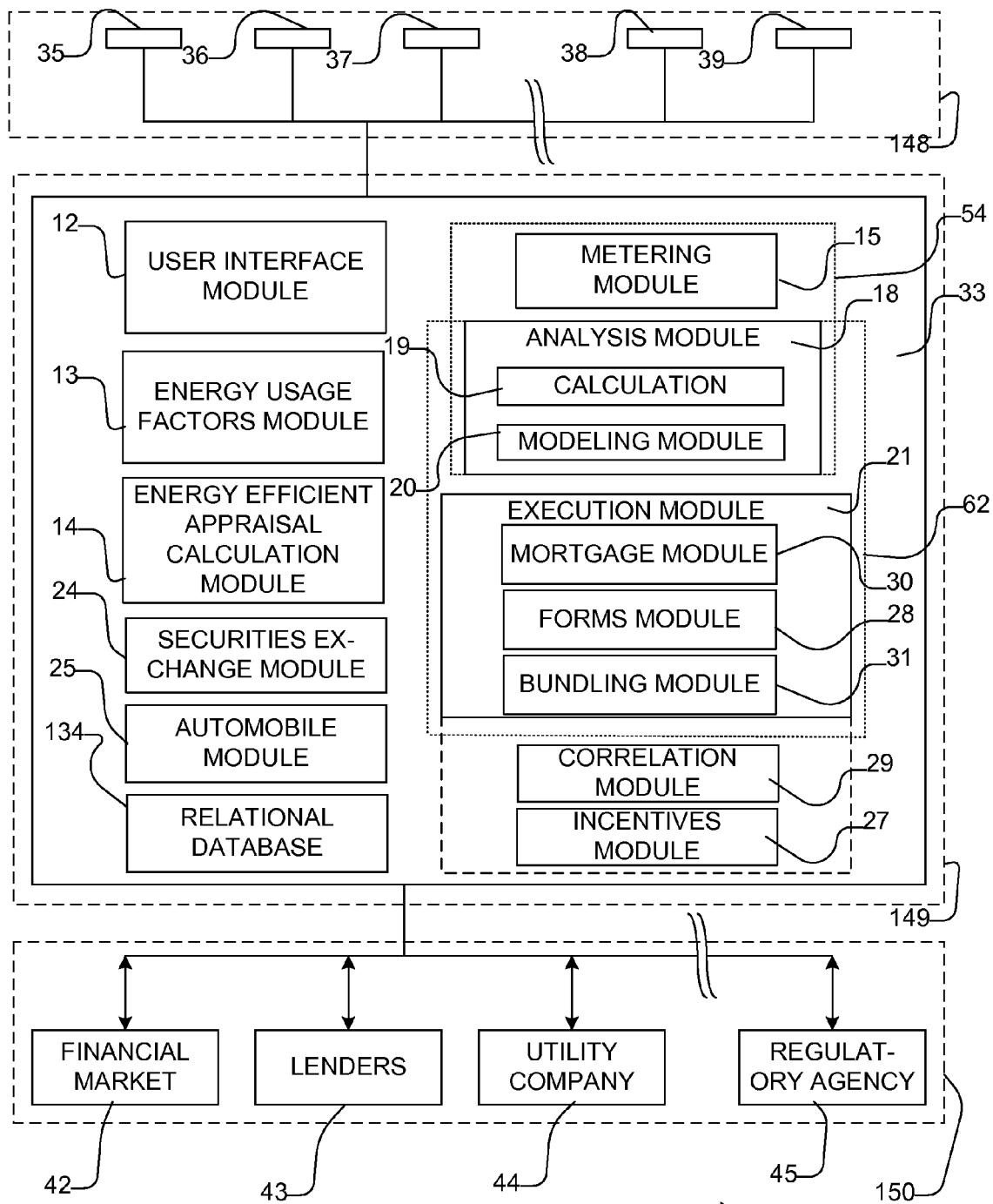
FIG. 1 is a block diagram of a system and apparatus for determining a savings in a utility and applying at least a portion of the savings to a financial transaction in accordance with embodiments of the present invention.

FIG. 1 is a block diagram of an energy quantification system (referred to herein as EQS or system) 10 for determining a savings, (which may be an effectual savings), and applying the savings to a financial transaction in accordance with embodiments of the present invention. The system 10 may include machine-readable code such as software having one or more modules associated with a variety of functions. For example, the code may include a user interface module 12, energy usage factors module 13, energy efficient appraisal calculation module 14, metering module 15, analysis module 18 optionally including calculation and modeling modules 19, 20, and execution module 21. Additional modules may include a securities exchange module 24 and an incentives module 27. Each of the modules may further have submodules. For example, the execution module 21 may include a mortgage module 30. The incentives module may be, or may include, a tax incentive(s) module. The machine-readable code may be stored in memory and incorporated into a computer 33 such as a Web server or other electronic device that includes a processor. It is to be understood that the several modules and components may be in a single electronic device or may be incorporated into a plurality of devices or computers that are interconnected to provide the intended function of the system 10.

In order to determine a savings the system 10 determines a usage of energy for any and all of a plurality of utilities. The system 10 may further include a plurality of detectors 35, 36, 37, 38, 39 that are configured to be associated with a plurality of utilities. For example, detector 35 may be a meter that detects a flow of natural gas to a residential or commercial building and transmits a signal representing the flow of gas to the computer 33 or other electronic device. Detector 36 may be a sensor that detects electrical power usage in the residential or commercial building. Detector 37 may include a meter for determining a flow of water to the building and sending a signal representing the flow to the computer 33. Detector 38 may include a sensor or other metering device indicating a flow, mass, or volume of sewage generated by the building. Detector 39 may be a sensor that detects and signals a quantity of trash in terms of mass or volume. Other detectors may be incorporated without limitation. For example, detectors that measure one or more of electrical current, electrical voltage, and temperature may be utilized. The temperature sensors may be utilized to obtain data for determining a threshold or baseline value with which current energy usage values are compared. The computer 33 or other electronic device may be operably connected to one or more of a plurality of entities that are either interested in the data collected by the computer 33, or from which entities the computer 33 is capable of receiving data. For example, the computer 33 may be connected to one or more entities in financial markets 42, lenders (such as mortgage companies or banks) 43, utility companies 44, and regulatory agencies 45.

Quantification by prediction may be achieved by accessing databases including data from historical data from utility companies, data collected from measuring usage for similar buildings, heating and cooling systems, appliances, and occupancy patterns. Thus, the database may be created with data sets from manufactures and measurements in buildings having similar energy usage factors. As such, the database may include the relational database 134 discussed in greater detail with regard to FIG. 7 below and data collected from actual use to create baselines for specific buildings having particular energy usage factors. The baselines will vary from one region or climate to another. It is to be understood that the financial markets may include existing or future commodities trading institutions. Thus, carbon credits or other commodities may be bought and/or sold through the system.

It is to be understood that certification of carbon credits requires an audit by an authorized independent party. The EQS 10 in accordance with embodiments of this invention may enable such authorized independent auditors to issue certificates to parties of interest through the system 10. Once a green construction project has passed its audit, the auditor can electronically submit the certificate to the party of interest through the EQS 10. Thus, the EQS 10 may verify when carbon or other credits have been certified.

The metering module 15 of the machine-readable code is configured to receive signals from the detectors 35, 36, 37, 38, 39 and quantify the actual usage of the various utilities that is being detected. Alternatively, the actual usage of the various utilities may be determined all or in part by obtaining the usage from another source such as a utility company, through modeling and/or mathematical formulas. The system and apparatuses of embodiments of the present invention are capable of utilizing usage data from other sources or signals representing usage from sensors provided independently of the system and apparatuses of the present invention. The analysis module 18 utilizes historic data and/or engineering modeling data to determine a baseline of usage for each of the utilities. This is achieved by execution of baseline formulas that have been developed to accurately represent the energy usage.

In a simple example, the current temperature and historic weather patterns may be used to calculate a baseline value of energy usage. Then the analysis module 18 determines the actual utility savings by comparing the actual usage to the baseline values. This may be accomplished by simply taking the difference between the actual usage and the baseline values. In one form the savings may be represented in terms of energy reduction (ER), baseline energy usage (BEU), and actual energy usage (AEU) and an equation relating these terms.

$$ER = BEU - AEU \qquad \text{Equation 1}$$

Where part of the value is provided by carbon credits, incentives from utility companies and governments, etc., the savings may be an effectual savings represented in terms including these additions to the value of the savings. These amount to part of the quantification of energy savings. For example, energy reduction value (ERV) may take into account ER, as described above. ERV for each commodity saved may also take into account carbon reduction (CR) and renewable energy credit (RE). The monetary savings can be represented by taking into the price per unit of each of these factors (EP), (CP), (RP) at a particular point in time, as indicated in a general equation.

$$ERV = \Sigma[(ER \times EP) + (CR + CP) + (RE \times RP)] \qquad \text{Equation 2}$$

Other more complex analyses may be undertaken to take into account additional factors. For example, in most cases, the cost of the improvements should be subtracted from the energy savings. The savings minus costs can then be amortized over the life of the improvements at the current interest rate to take into account the time value of the money saved. Alternatively, the lender can re-amortize the loan after taking into account the saving (minus the costs) that will be applied to early repayment. In one embodiment, specific formulas are developed for calculating the energy efficiency on all utilities. In any case, the metering module 15 and the analysis module 18 quantify the usage and the savings, and make these values available in a form that is understandable and useful to one or more users including the various interested entities 42, 43, 44, 45 through a user interface module 12. In this regard, the machine-readable code of embodiments of the present invention is configured to interact with conventional computer programs and machine-readable code in computers utilized by these various interested entities. Thus, the information derived from the formulas and through the analysis is translated into a form usable by the financial and real estate markets.

In one embodiment, the analysis module utilizes any of a variety of mathematical formulas to calculate the baseline value and the savings. The mathematical formulas may incorporate numerous variables that are supplied from among data that includes one or more of geographical regions, weather patterns, temperatures, and building usage times and patterns.

The building usage patterns may include occupancy times, heating and cooling requirements, etc. Theoretically, the more variables that are used in this calculation, the more accurate will be the resulting quantification. On the other hand, it is to be understood that some variables will be less significant or negligible relative to others.

The execution module 21 utilizes the data, including data from the analysis module, and any user input to apply at least a portion of the savings to one or more financial transactions. For the purposes of this disclosure financial transactions include one or more of quantification and/or valuation of savings into dollars or other monetary units, prepayment of a loan, purchase of a commodity, request for an incentive credit, initiation of application for a tax credit, etc. In the embodiments shown in FIG. 1, the execution module 21 includes a mortgage module 30 for controlling early repayment of a mortgage loan based on the utility savings. It is to be understood that the mortgage module 30 could be separate from the execution module 21 and still function together with the execution module 21 to implement repayment of the mortgage loan. Although shown separately, the securities exchange module 24, the incentives module 27, and/or other modules could be incorporated into the execution module 21.

In particular, the machine-readable code on computer 33 or other electronic device may be configured to interface with mortgage companies or other lenders for the purpose of transmitting quantified data representing energy usage, credits earned, incentives qualified for, and/or energy produced. Additionally or alternatively, the computer 33 or other electronic device may interface to transmit quantified saving data including energy savings and/or other utility savings so that the mortgage companies can apply at least a portion of the savings to early repayment of mortgagee's loans. The machine-readable code may also be configured to automatically and regularly remit a predetermined portion of the savings as an early repayment of the loan.

The machine-readable code is configured to interact with a utility company 44, for example, to receive historic and/or current data on a usage of a utility. The historic data can be used by the analysis module 18 to compare the historic data to the current usage data and to determine the utility savings. Alternatively or additionally, the machine-readable code may be configured to supply data to the utility company 44 for comparison with their records of usage and/or for sending data indicating a quantity of energy put back into the grid by the building when the building is an energy producing structure.

The machine-readable code may include the securities exchange module 24 that is configured to interact with companies in the financial market 42 for the purpose of purchasing securities or for selling carbon credits, for example. Thus, data representing the purchase or sale values of at least a portion of the utility savings may be transmitted by the securities exchange module 24 to the financial market 42. Similarly, data representing market values of the securities or carbon credits may be transmitted from the financial market to the computer 33 or other electronic device.

The machine-readable code may also be configured to interact with one or more regulatory agencies for the purpose of receiving data or other information regarding interest rates, tax incentives, and/or carbon credits, for example.

Figure 2:
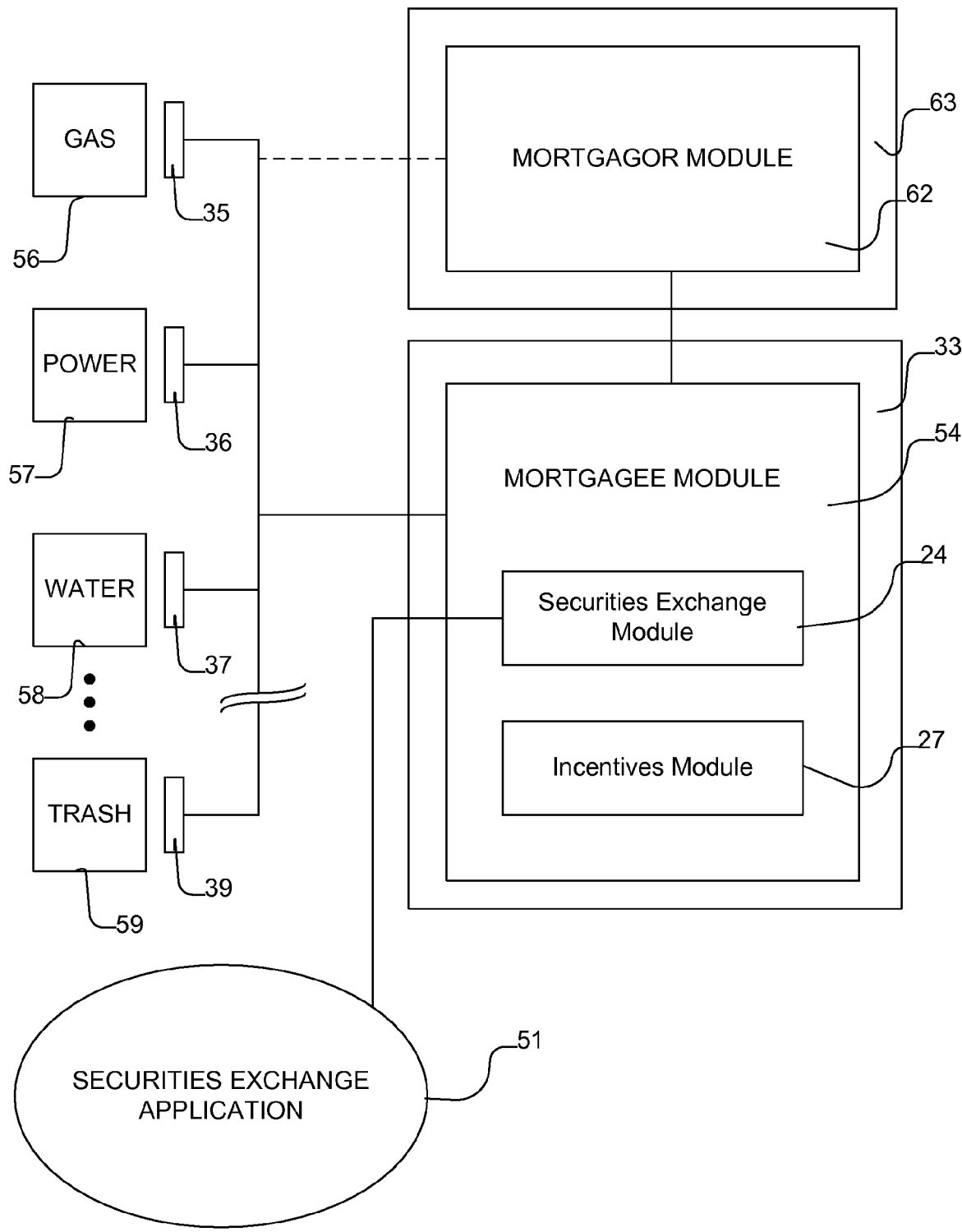
FIG. 2 is a another block diagram of a system and apparatus for determining a savings of utilities and applying at least a portion of the savings to a financial transaction corresponding to a portion of the block diagram of FIG. 1 in accordance with embodiments of the present invention.

As shown in the specifics of FIG. 2, the apparatus for determining energy usage, determining a related savings of a utility, and applying at least a portion of the savings to a financial transaction may further include the securities exchange or trading module 24 that is configured to interface with the execution module 21 (shown in FIG. 1) and a securities exchange application 51 that may be available in the financial market 42 for automatically applying at least a portion of the savings to investment in a securities exchange market. The securities exchange application 51 may be one of several applications belonging to respective trading institutions throughout the country and/or around the world. As such, the securities exchange module 24 is configured to interface with a variety of applications and is capable of sending and receiving data in a compatible or converted form. In this way, the execution module 21 can interface with the security exchange institutions to buy and sell carbon credits, renewable energy credits (RECs), and/or other incentives of value. Alternatively, the securities exchange application 51 may be integrated as a non-remote module in the apparatus, and may receive regular or frequent updates to data from the financial market.

An automobile module 25 may also be included for analyzing savings and credits associated with green features on automobiles. The automobiles may have green features that are provided by the original manufacturer or that are retrofitted to the vehicles. As with real estate property improvements, values of green features on automobiles may be quantified, bundled, and/or applied to transactions for individuals or companies. Automobile manufactures may benefit greatly from bundled values of carbon credits or other credits that can be traded or sold.

FIG. 2 also shows the securities exchange module 24 and the incentives module 27 forming part of a mortgagee module 54. It is to be understood that the mortgagee module 54 may include all of the modules and submodules shown in FIG. 1. Alternatively, the mortgagee module 54 (represented by the dashed line labeled 54 in FIG. 1) may include at least a portion of at least one of the analysis module 18 and the metering module 15. The mortgagee module 54 may be supported on a computer 33 or other electronic device located at the mortgagee's building, for example. Thus, the detectors 35, 36, 37, 39 may be directly associated with respective utilities such as gas 56, power 57, water 58, and trash 59, for example. That is, sensors, meters, and/or other detectors may be placed on gas, power, and water lines or meters as needed. The detectors 35, 36, 37, and 39 are operatively connected to the computer 33 or other electronic device in order to transmit signals representing usage of the various utilities. It is to be understood that the connection between the computer 33 or other electronic device and the detectors or other devices may be wired or wireless connections.

While the machine-readable code providing the various modules shown in FIG. 1 may be configured to interface with conventional computer programs and code utilized by interested entities 42, 43, 44, and 45, these interested entities may alternatively have respective modules loaded on their computers for interfacing with the various modules shown in FIG. 1. Thus, FIG. 2 shows a mortgagor module 62, which may be supported on a computer 63 located at one of the lenders corresponding to lenders 43 in FIG. 1. It is not required that the modules shown in FIGS. 1 and 2 be located at the user's or mortgagee's building. In fact, in one embodiment, all the modules shown in FIG. 1 may be incorporated into the mortgagor module 62 of FIG. 2. In this case, the mortgagee module 54 would not need the securities exchange module 24 and the incentives module 27 because they would be included in the mortgagor module 62. Signals representing the utilities usage could be transmitted by a wired or wireless connection from the user or mortgagee's building to the mortgagor module 62 at the mortgage company. While the mortgage company has a direct interest in applying the utility savings to early payment of a mortgage loan, the machine-readable code and modules on the computer 63 at the mortgage company could still implement investment in securities and initiation of incentive credit and/or tax credit requests for the mortgagee. Alternatively, these credits could be received by the mortgagor or developer in exchange for improved loan terms to the mortgagee.

In an alternative embodiment, a dashed line labeled 62 in FIG. 1 shows the mortgagor module 62 including at least a portion of at least one of the analysis module 18 and the execution module 21.

It is to be understood that the number and type of utilities monitored to quantify usage, and the utility savings to be quantified in accordance with the embodiments of the present invention is unlimited. While FIGS. 1 and 2 show gas, power, water, sewer, and trash, other utilities may be monitored for savings as well. For example, other fuels such as heating oil, coal, alcohol, diesel fuel, etc. may be additionally or alternatively monitored and quantified. Still, the metering and analysis modules determine usages of the plurality of utilities and compare the usages with predetermined baseline values of the respective utilities to quantify savings.

While the various modules have been described as providing a system and apparatus for determining a savings in a utility and applying at least a portion of the savings to a financial transaction, it is to be understood that such a system and apparatus may include as few as one of the modules described, or may include more than the number of modules shown and described. In any case, the system an apparatuses described herein may be used to implement embodiments of the method of the present invention described below.

The schematic flow diagrams that follow are generally set forth as logical flow diagrams. As such, the depicted order and labeled steps are indicative of embodiments of the presented method shown in respective figures. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
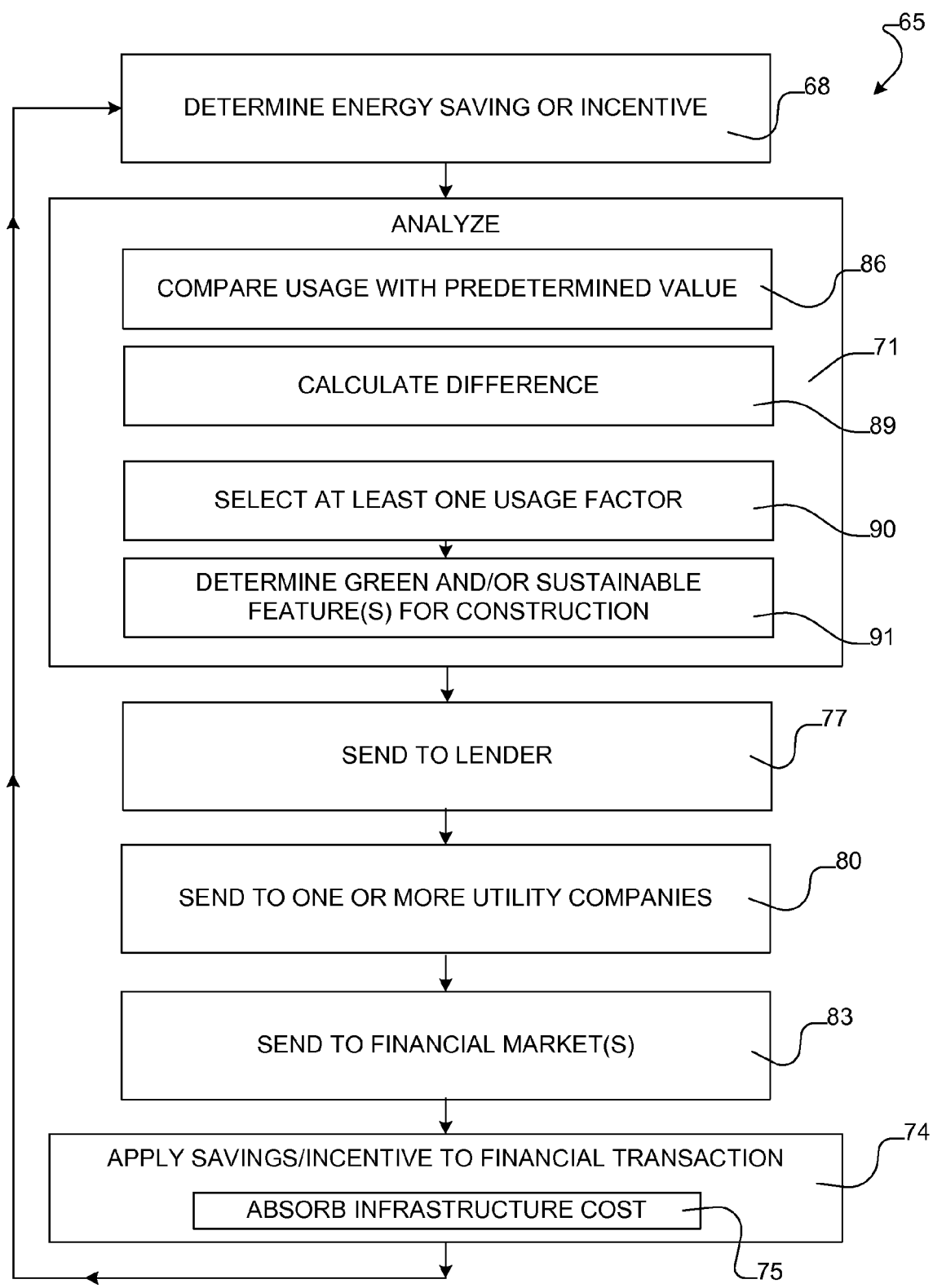
FIG. 3 is a block diagram illustrating a method for determining a savings and applying the savings to a financial transaction in accordance with embodiments of the present invention.

FIG. 3 is a block diagram illustrating embodiments of a method 65 for determining a utility savings and applying the savings to a financial transaction. In one embodiment the method includes determining an energy saving or an incentive 68, analyzing a savings associated with the usage 71, and applying at least a portion of the savings to a financial transaction 73. In a specific case, determining the energy savings includes detecting or determining a usage of a least one utility 74. Also in a specific case, the savings is applied in a way that absorbs infrastructure costs 75. Additional embodiments include sending data to a lender such as a mortgage company 77, sending data to one or more utility companies 80, and sending data to one or more entities in the financial markets 83. As may be appreciated, embodiments of the method may include receiving data from one or more of the lender, utility companies, and entities in the financial markets. Applying at least a portion of the savings to a financial transaction may simply consist of valuating a savings in a utility usage. On the other hand, applying at least a portion of the savings may include one or more of making an early payment on the principle of a loan, obtaining credits for energy or other utilities conserved or produced, and investing in the financial markets.

In one embodiment, the step of determining or detecting usage 74 includes detecting usages of the plurality of utilities. As may be appreciated, depending on the utility being detected, detecting may include sensing at least one of mass, volume, flow, current, energy, and temperature. Signals representing usage of the one or more utilities are received and analyzed. This may be done in real-time, resulting in quantification of real-time energy usage. The step of analyzing may further include comparing the usage with a predetermined value 86, and calculating a difference between the actual usage and the predetermined value 89. The predetermined value may be a baseline, as discussed in other parts of this disclosure. Thus, applying at least a portion of the savings 73 may include applying at least a portion of the difference between the actual usage and the predetermined value to the financial transaction. Alternatively or additionally, the step of analyzing 71 may include selecting at least one usage factor 90. For example, the method may include selecting a climate or climate region, and accessing data associated with that climate. By accessing temperatures and wind speeds, for example, the step of analyzing can pull up data and/or calculate a base line usage of energy to which an actual usage can be compared. Alternatively or additionally, the step of analyzing can calculate a predicted usage of energy with one or more green and/or sustainable features incorporated into a building. Likewise, analyzing 71 may include determining a green or sustainable feature for construction 91.

One of the benefits of the embodiments of the method in accordance with the present invention is that the steps of detecting, analyzing, and applying may be achieved automatically under the control of instructions embodied in machine-readable code that may be stored in storage media or memory of a computer, or that may be supported on an electronic device. Similarly, the steps of sending and/or receiving from lenders, utility companies, and entities in the financial markets may also be automated. Thus, all or part of the utility savings may be automatically applied to one or more of early payment on a loan principal, request for credit, and investment in the financial markets.

It is pointed out that embodiments of the system and method in accordance with the present invention that access data from multiple data sets and sources, and provide them through a single application together with the standardization of energy usage and savings units also make possible the application of these savings to financial transactions substantially universally. Much must be done going forward to develop and backfill the database that provides green and sustainable energy information for global markets. The way the database is organized and maintained provides a blueprint for managing green and sustainable energy information. This database and the quantification described herein streamline applying energy savings to financial transactions. In a specific application, the database and quantification streamline processes for capitalization and securitization of mortgage loans for environmentally friendly buildings. Applying energy savings and credits to financial transactions in accordance with embodiments of the present invention move participants toward energy and financial independence.

The database includes data on tax credits, tax deductions, and other incentives. Furthermore, the database includes forms for applying for the various incentives programs. The system 10 include a forms module 28 configured to automatically fill in and/or submit the forms that it accesses from the database on behalf of the participants.

Embodiments include methods of doing business, which may include one or more software programs that enable the business methods. One of the advantages of the methods and the related technology that is incorporated into associated apparatuses and systems is that they facilitate a quantification of energy savings in building construction. In one embodiment, the quantification of the savings allows mortgages to be issued based on the amount of savings anticipated and to then directly tie mortgage payments to the actual savings. This embodiment of the method enables approval of loans having better terms for the borrower and/or facilitates accelerated loan payoff. Embodiments of the invention also facilitate securities trading based on one or more of anticipated savings, actual savings, carbon credits, and net savings. Other embodiments may include a combination of the mortgage program and securities trading in which sale of carbon credits or other investments may be tracked by the software.

For the purposes of this disclosure, net savings means incentives paid by electric and other public utility companies for energy or other utility benefits produced at a business or residence that is/are returned into the grid system. These, like the other savings, can be applied to repayment of a mortgage loan. Other types of incentives paid by these utility companies or the government could also be applied in embodiments of the method. These incentives may include credit incentives, rebates, and/or tax deductions for switching to more energy efficient furnaces, increasing insulation, building green, etc.

Software may be applied at the residence or commercial building that is being upgraded or built with energy efficient or energy producing features. The software may be run on a computer at the residence or commercial building. Alternatively or additionally, other digital processing devices may be utilized. For example, a microprocessor or programmable logic controller (PLC) may be configured to carry out one or more of the steps of detecting, analyzing, and applying. The microprocessor may also be configured to send and/or receive signals to and from one or more of lenders, utility companies, and financial markets. Signals may be sent and received through wired or wireless network(s). Sensors may be placed on the electricity meter and other locations for monitoring power, gas, and other utilities to determine the amount and cost of the utilities being used.

In one embodiment of the method, a computer or other digital processing device collects the data and uploads it to a server running at a mortgage company facility. Software and/or some other digital processing mechanism at the mortgage company calculates the amount of energy expended, the cost of that energy, and the actual saving as compared to a baseline value during a predetermined period of time. The amount of savings is then applied to the mortgagee's loan principle, accelerating the loan repayment. The money can either be directly withdrawn from the banking account of the mortgagee, or applied in some other manner. It is to be understood that similar embodiments could be applied through software and/or other digital processing devices located at the residence or commercial building for which the loan has been issued, or at a completely separate location. Whether performed electronically or otherwise, at least a portion of the savings can be applied to repayment of the loan principle to accelerate repayment.

In one embodiment, the method includes drawing up a mortgage that provides favorable terms based on the anticipated energy savings. In another embodiment, the method includes contractually binding the mortgagee and the mortgage company to accelerate repayment of the mortgage based on the amount of actual savings. That is, a contract would give the mortgage company the right to automatically apply at least a portion of the savings to early payment on the principle of the mortgage loan. The amount of the savings to be applied may be a predetermined maximum or a percentage of the savings, and may be written into the contract. Software and/or other digital processing devices may be installed at the mortgagee location and/or the mortgagor's facility. The sensors or other detectors may be installed on one or more of the electric meter and various other locations. The software may also tie into one or more of carbon credit trading locations, net savings locations such as utility companies, and other incentive savings locations such as governmental agencies. The software and/or other digital processing devices then collect data regarding energy and/or other utility usage over the course of the month, for example. Incentives for which the savings qualify the mortgagee and/or mortgagor may be tabulated and uploaded to the mortgage company. The mortgage company calculates the savings, applies the savings to accelerate the mortgage payment, and sends a bill reflecting the early payment to the mortgagee, (or the mortgage company otherwise receives payment on the accelerated basis.) It is to be understood that the same detecting, quantifying, and applying of usage and savings may be managed by one or more entity other than the mortgage company without limitation.

Figure 4:
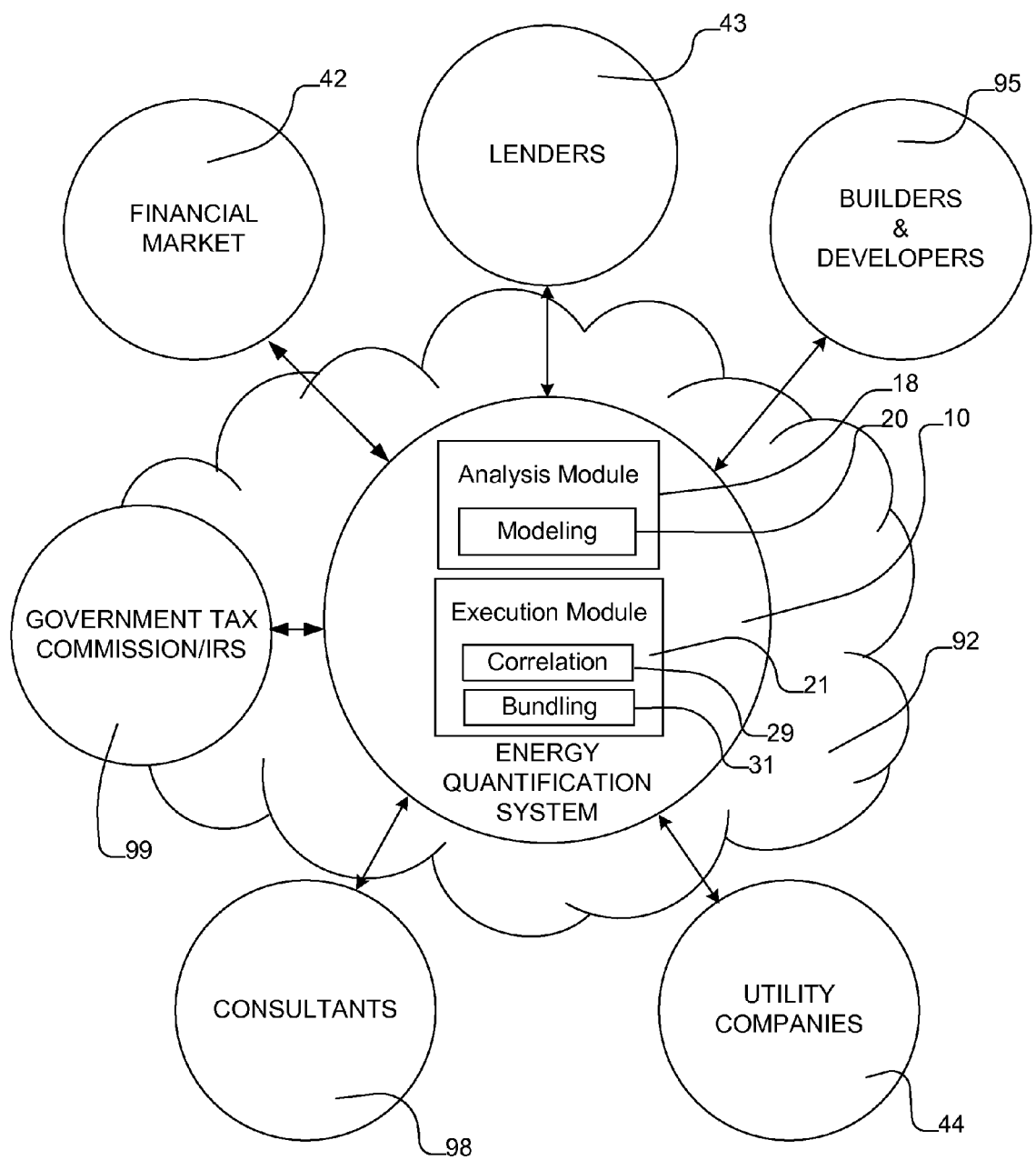
FIG. 4 is a diagrammatic representation of the extensive usefulness of a system for determining a savings in a utility and applying at least a portion of the savings to a financial transaction in accordance with embodiments of the present invention.

FIG. 4 is a diagrammatic view illustrating how the EQS 10, in accordance with embodiments of the present invention, may be interconnected with a variety of entities that are interested in participating in the programs and methods associated with the system. Indeed, the system 10 and related methods may be made available universally to any and all interested entities. For example, data and instructions may be communicated over a network 92 such as the Internet and/or a telephone network. The network 92 may include wired and wireless connections. As shown in FIG. 4, whether the EQS 10 is located at a location of the mortgagee, mortgagor, some other location, or at a combination of locations, the system 10 can be operably connected over the network 92 to a variety of interested entities including entities in the financial markets 42, lenders 43, and utility companies 44. Other interested entities may include builders and developers 95, consultants 98, and government agencies 99 such as tax commissions and/or the Internal Revenue Service (IRS).

As described above, the EQS 10 includes an analysis module 18 for calculating energy usage/energy savings, and an execution module for applying the savings to a financial transaction. The analysis module 18 may include a modeling module 20 for modeling the savings/incentives to users. The system 10 also includes the execution module 21, as discussed above. As shown in FIGS. 1 and 4, the execution module 21 may include a correlation module 29 for correlating all the available green incentives with each of the green construction projects. The execution module may also have a bundling module 31 to facilitate modeling of the savings/incentives to users and for bundling savings/incentives in attractive and concrete ways. In some embodiments, the correlation module 29 and the bundling module 31 may not form part of the execution module 21. In any case, these modules make the payback mechanisms clear and viable for the financial market 42 and the lenders 43. For example, if a financial institution can easily have numerous incentives automatically quantified and bundled to have a definite value through the EQS 10, then the financial institution will readily use the system 10 to identify the effectual savings, consider improved rates for loans, and otherwise pass at least some of the savings along to consumers, developers, and others. Thus, the EQS 10 forms a bridge or nexus platform between the builders and developers 95 on one hand and the financial market 42 and the lenders 43 on the other hand with regard to green or sustainable energy construction projects. The systems and methods are presented with a high degree of visibility and transparency resulting in positive public relations for all types of users of the system 10 for continuing in or entering the emerging green/sustainable energy markets.

Figure 5:
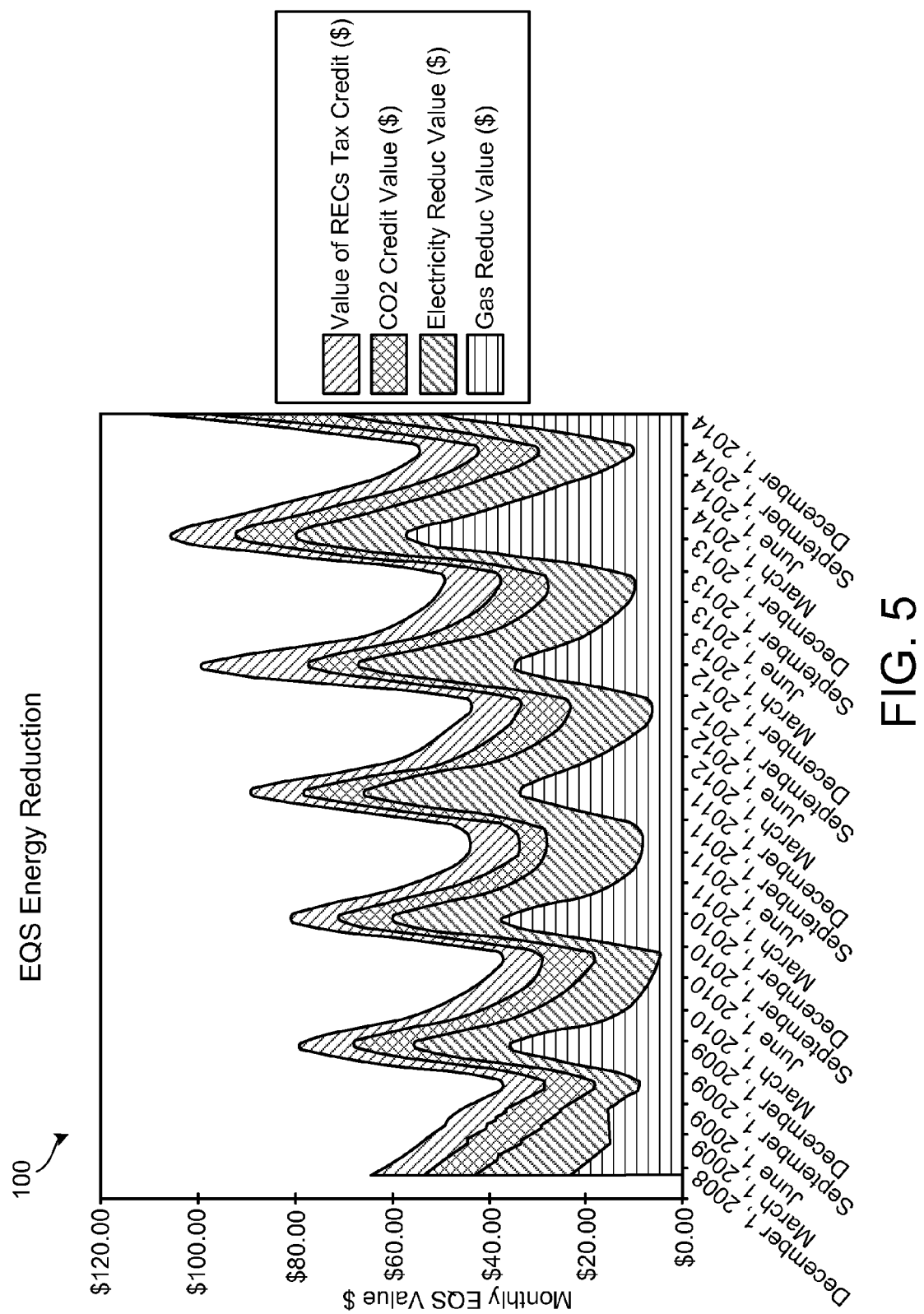
FIG. 5 is a graph showing quantified energy reduction values in accordance with embodiments of the system and methods of the present invention.

For example, referring back to Equation 2, a visual illustration in the form of a graph 100 shown in FIG. 5 makes clear the energy reduction value (ERV) for a particular building or retrofit project. As shown, there is more overall energy saved during the winter months even though more electricity is used and saved during the summer for the particular building and in the climate selected. The dollar value of the savings is indicated by the curve of the graph as compared with the amounts shown on the left hand side of the graph 100. Thus, the energy savings becomes clear to the user, and he/she can readily understand an average savings that will be available to be applied to repayment of a loan or another financial transaction such as application of the savings to purchase of a tradable commodity.

The system 10 and methods in accordance with embodiments of the present invention also bring together resources and benefits from the financial sector, well-established Internet based platforms and entities, renewable energy policy makers, and energy raters. In one embodiment, resources and benefits are made available together in a single site on an Internet Website. In exchange for the benefits of using these resources from a single place and the other advantages of the systems and methods describe herein, users may be required to pay fees. These fees may include one or more of membership fees, licensing fees, royalty fees, and product override fees/marketing fees for green/sustainable products. An example of a benefit that users will most likely be willingly to pay for through these fees is the creation of baselines for the green financial models. These baselines are needed by the financial and real estate markets for more universal entry into the green/sustainable building markets. Fees for using the energy quantification databases, which may include these baselines, may also be charged. Owners of Internet-based applications supporting the systems and methods may charge fees for the development and maintenance of the applications. These fees may be passed through to users in addition to directly associated fees such as mortgage loan fees to help cover business costs.

In one embodiment, the EQS 10 includes machine-readable code supported on a server remote from the mortgagee and the mortgagor. In this embodiment, consultants 98 may use the EQS 10 to help builders and developers 95 to benefit from utility savings programs. In accordance with this embodiment, individuals or corporations wishing to conserve energy or to become energy producers in their building projects can access the needed information and become participants in the utility savings programs including programs that are set up to help mortgagees pay off their mortgages early. In this regard the system 10 may be supported on a platform that is universally available. For example, the platform may be a Web-based platform. Such a platform may be developed from scratch or the method may be implemented on existing platforms that are already well known and universally accessible. In any case, the system 10 and method 65 may be platform independent.

Figure 6:
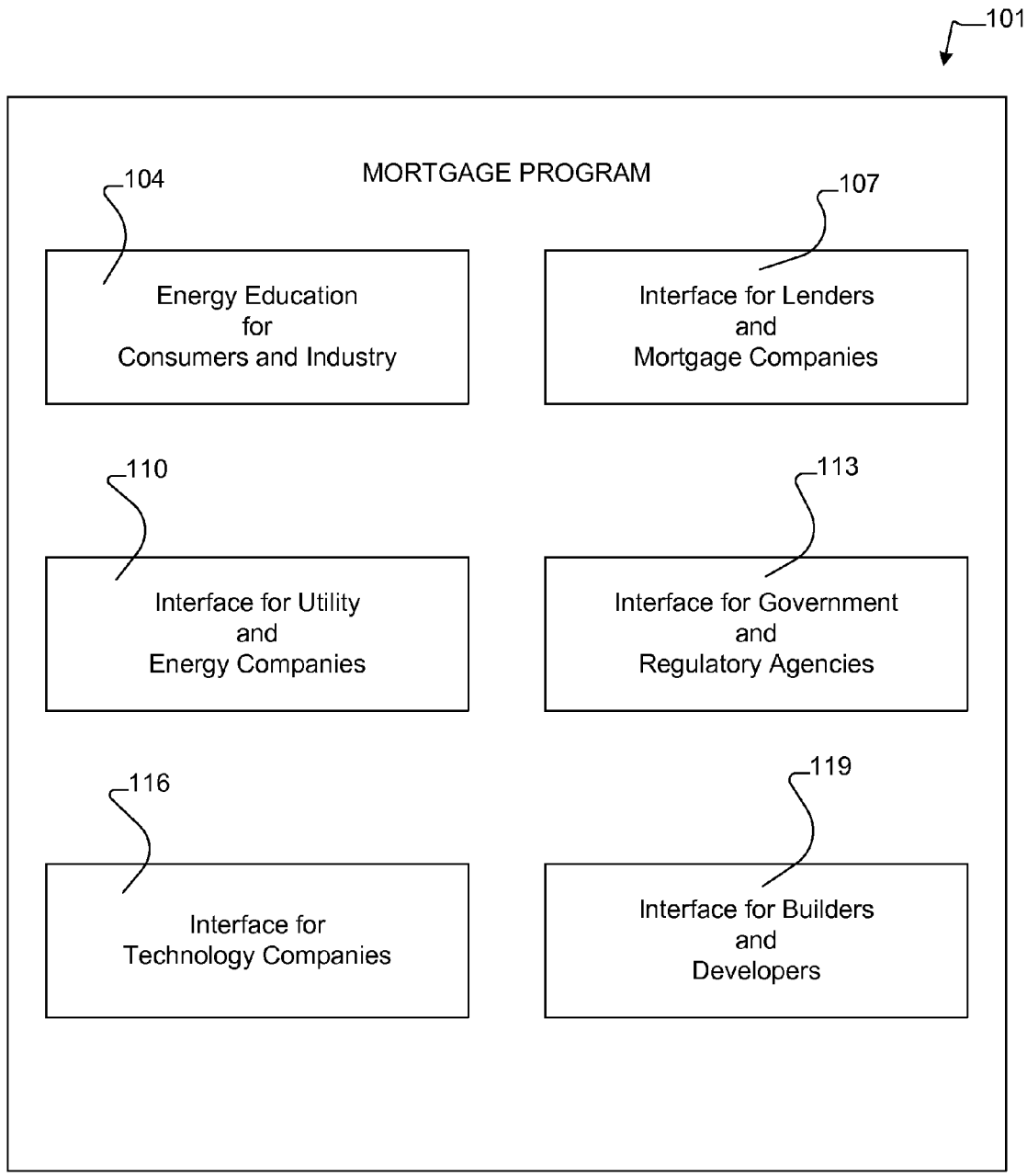
FIG. 6 is a block diagram showing specifics of one aspect of the system and apparatus for determining a savings in a utility and applying at least a portion of the savings to a financial transaction in accordance with embodiments of the present invention.

FIG. 6 is a diagrammatic view of an example of at least a portion of a program 101 that is available to interested entities. In this example, the program 101 is a mortgage program. Such a mortgage program may be embodied in a mortgage module 30 as shown in FIG. 1. As described above, the mortgage module 30 may be located at the mortgagor or the mortgagee, or may be located at a separate location such as on a server on the Internet. The mortgage program may include energy education for consumers and the industry 104. In addition to benefiting the public as an educational tool, the energy education and its presentation through the systems and methods described herein also facilitate marketing of green/sustainable energy technologies, including the systems and methods described herein. The mortgage program 101 may also include several interfaces that are provided by respective submodules for communication and/or data transfer to and from interested entities. These entities may include lenders and mortgage companies as indicated at 107, utility and energy companies as indicated at 110, and government and regulatory agencies as indicated at 113. Other interested entities may include technology companies, builders, and developers, as indicated at 116 and 119. The machine-readable code and/or other digital processing mechanisms that at least in part make up the mortgage program 101 may be configured to be compatible with conventional software that is typically used by the various interested entities. Additionally or alternatively, compatible software may be provided, such as by a download, to each interested entity. Thus, data can be transferred and transactions can be executed without difficulty.

Figure 7:
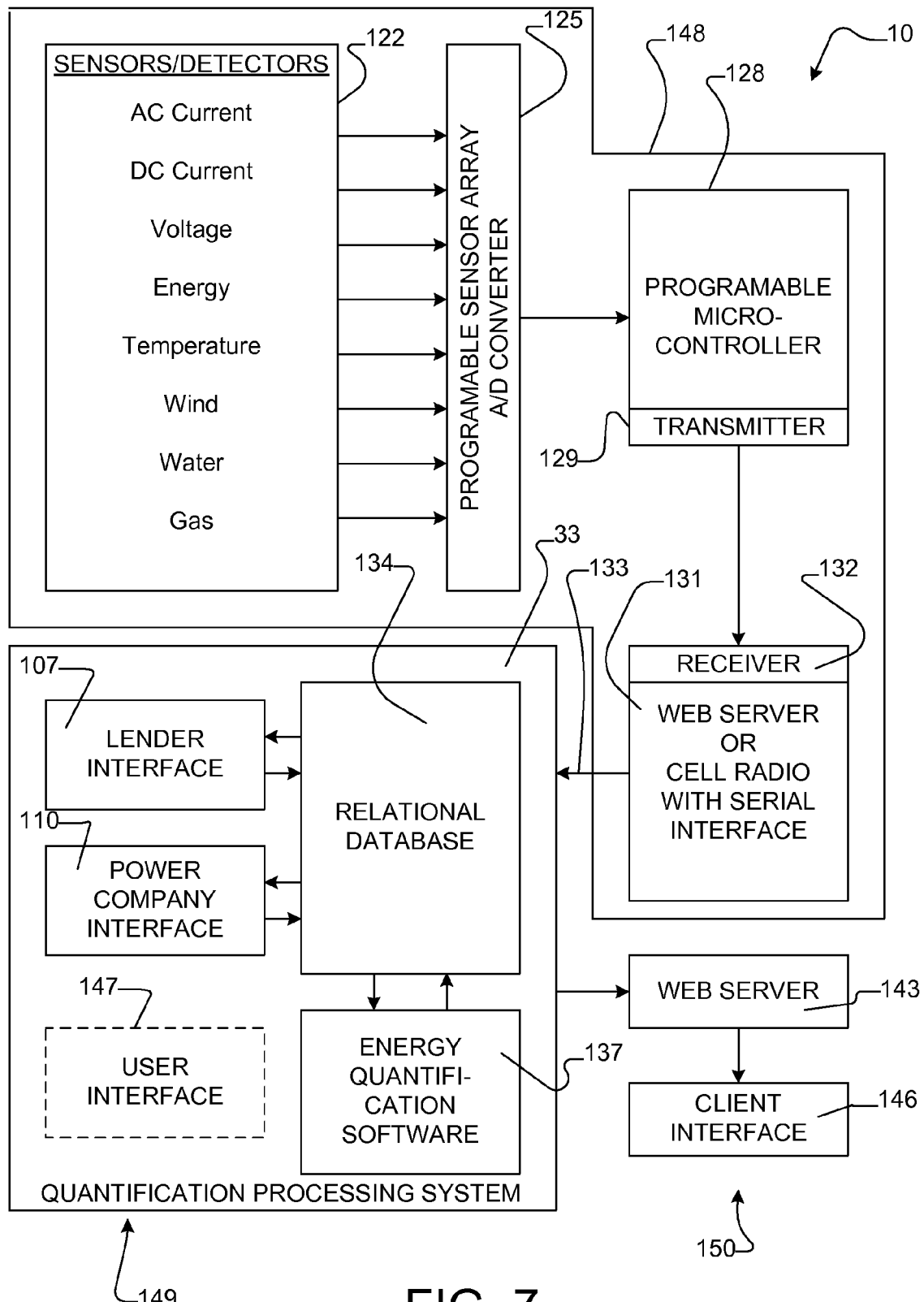
FIG. 7 is a block diagram showing specifics of one aspect of the system and apparatus for determining a savings in a utility and applying at least a portion of the savings to a financial transaction in accordance with embodiments of the present invention.

FIG. 7 shows another block diagram of the system 10 for determining a utility savings and applying at least a portion of the savings to a financial transaction similar to the block diagram of the system 10 shown in FIG. 1. However, FIG. 7 shows additional details. Each of the elements shown in FIG. 7 can be manufactured and supplied as a package or separately. Thus, the system 10 shown in FIG. 7, as well as in FIGS. 1 and 4, is an article of manufacture or a set of articles of manufacture. The articles of manufacture may include a set of sensors or detectors 122 and instructions regarding installation of the sensors or detectors 122. The sensors or detectors 122 may include a programmable sensor array. An analog/digital converter 125 may be associated with the sensors or detectors 122 in order to convert analog signals to digital signals usable by a digital processing device such as a programmable logic controller (PLC) or a programmable microcontroller 128. The programmable microcontroller 128 may include a transmitter that transmits signals from the various sensors or detectors 122 to a Web server or cell radio 131. The transmitter may be an RF transmitter, blue tooth, or cell phone based transmitter, for example. Alternatively, the microcontroller 128 may be wired to the Web server or a controller connected to the Internet. While a variety of sensors or detectors 122 are shown, it is to be understood that the system may include as few as one sensor/detector, or may include any number of sensors/detectors 122 greater than those listed in FIG. 7.

If the cell radio 131 is utilized to receive data from the programmable microcontroller 128, then another cell radio could be provided as a transmitter 129 together with the programmable microcontroller 128 and a serial interface to route the various signals from their respective sensors or detectors 122. In either case, the Web server or cell radio 131 has a receiver 132 for receiving the signals representing the utility usage. The Web server or cell radio also transmits the signals through a link 133 to a quantification processing system such as a computer 33 or other digital processing device that includes the various modules described with regard to FIG. 1 above. For example, the computer 33 may receive signals through the link 133 from the Web server or cell phone 131. The link 133 and the other links needed for communication between the various devices may include one or more of a modem, cellular network(s), satellite network(s), and the Internet. Thus, the signals can be received and/or processed for use in a metering module, analysis module, and execution module according to instructions in machine-readable code held in storage media in the computer 33.

The computer 33 may also have a relational database 134 stored therein, (also shown in FIG. 1). The relational database 134 may include historical data, data regarding weather patterns for various regions of a state, country or the world, data regarding building occupancy, and utility usage time data, for example. In one embodiment the analysis module uses this data to determine baseline values for utility usage for comparison with the actual utility usage represented by the signals received from the sensors or detectors 122. The metering module, analysis module, and execution module may be provided in the energy quantification software 137, which can send data to and receive data from the relational database 134. It is to be understood that the relational database 134 may be stored on one or more remote server(s) or other computer(s) on a network with which computer 33 may be connected. The relational database 134 may be integrated with other database(s) such as those that store usage data, for example.

The relational database 134 and/or any additional databases utilized by the EQS 10 may be compiled from existing data sets and/or data sets that are created through research and information gathering by a research team. For example, real-time energy usage data based on a particular building structure may be collected through the use of sensors or detectors 122 inside the building, at the meters, or on the supply lines. These sensors or detectors 122 may be configured to send information regarding where the energy is coming from and the amount of energy used. The sensors 122 can also detect the amount of energy produced. Alternatively or additionally, the usage data may be historical usage data for a particular building structure. Such usage data may be obtained through research and/or usage records and may be compiled over a period of months or years.

Another source for data is from building comparables or comparable building structures. Data sets for energy usage for comparable buildings are available through established databases like the MLS. These data sets can be tracked for buildings in the same area and having building structure and construction similar to the target building for which energy usage and savings it being quantified. Once again, the research team can compile information from comparable buildings to populate the databases used by the EQS 10. This process of research and compilation may be at least one of manually and automatically implemented.

The database(s) may also include building shell characteristics. Data for the building shell characteristics including data regarding climate zone, building orientation, wall material, insulation, windows, roof, floor, foundation, etc. This data may also be obtained and compiled through research. Basically, the research team goes out and gets the information relating to the building shell and materials from the manufacturers, government studies, and/or websites. When renewable energy equipment is to be utilized, data regarding the renewable energy equipment characteristics is obtained. For example, when a manufacturer comes out with a new product, the research team will obtain and compile the information. The research team may be prompted to seek information from a particular source by survey results obtained, for example, when a potential participant in the energy quantification program tells what equipment he/she intends to use. Then the team can contact the manufacturers of the equipment to get the needed information. The data obtained may include equipment type and manufacturer, efficiency rating(s), output characteristics, energy input, output measurements, etc.

Regional climate data may be obtain from the National Oceanic and Atmospheric Administration (NOAA). The databases may be updated frequently, such as daily, for example. Frequent updates may help to provide an explanation when energy usage or cost changes dramatically. For example, for a building being monitored by the EQS 10, if the energy usage spikes when compared with measured or detected energy usage over a period of months, then the system can flag the dramatic change. The system can track the usage on a daily basis and identify any correlation with dramatic climate changes. Another source of the regional climate data may be the National Weather Service, other agencies, and/or organizations.

The databases may also include data for conventional energy equipment including equipment type and manufacturer, efficiency ratings, output characteristics, energy input and output measurements, etc. This data would include conventional HVAC and any energy systems that are not renewable such as energy systems that receive energy through conventional energy grids. For this data, the research team would go to manufacturers of the equipment. Among other things, this information can be used in establishing the baseline values of usage for comparison by the EQS 10.

Another data set that is created is occupancy data. This data may be obtained through surveys as described herein. For example, when a family subscribes to the energy quantification program, they can provide the occupancy data through answering questions about their usage, conservation habits, numbers of occupant, dates of birth, etc. The data can then be analyzed and the results compared to the mathematical baselines for conventional occupancy usage.

Other data sets that are researched and compiled by the research team may include local energy and utility data. This data can be obtained by researching utility company names, services, and prices per unit of energy. Other data that is researched and compiled may include government and manufacturer credits and rebates. This data can be accessed from government data sets including local, state and federal agencies, and from manufacturers. The databases will also include data regarding manufacturers and/or utility companies that have rebates for using renewable energy sources. Data may also include building code information that is applicable to energy conservation and/or sustainable features. The research team may obtain this data from state, local and/or federal agencies that maintain these data sets. Additionally, the databases may include data on renewable/sustainable energy manufacturers and contractors. This data would include contact information for contractors and manufacturers. The data may also include a certification status or grade to provide a graded recommendation mechanism for consumers. This data may also be obtained through research.

While the preceding paragraphs describe various examples of data sets and data sources for the database(s), including the relational database 134, it is to be understood that these examples are not to be limiting. The data may be obtained through any of a variety of mechanisms including steps taken by one or more human(s) and/or through automated systems utilizing the Internet, for example. Additional sources and data sets may be accessed for researching and obtaining data, and for populating the databases utilized by the EQS 10 without limitation.

The computer 33 can also have a lender interface 107 and a power or energy company interface 110 similar to the interfaces shown and described with regard to FIG. 6. The lender interface 107 and energy company interface 110 may form part of a mortgage program or module 101 in accordance with the embodiment shown in FIG. 6. In one embodiment, the mortgage module 101 may also include the energy quantification software 137. Alternatively, the energy quantification software 137 may include the lender and energy company interfaces as well as one or more of the modules shown in FIG. 1. Further alternatively, the system 10 may include the mortgage program 101 shown and described with regard to FIG. 6.

The computer 33 may be operatively connected to another Web server 143, which in turn is connected to a client interface 146. The client interface 146 may include a user interface module and any number of input/output devices. Thus, a user can pull up reports and illustrations showing data, utility usage, and calculations including savings calculations on a screen. For example, the graph 100 shown in FIG. 5 could be presented through user interface 147.

Alternatively or additionally, the computer 33 may include a user interface 147 that includes a user interface module and any number of input/output devices. Thus, a user can pull up reports and illustrations showing data, calculations, and utility usage on a screen. For example, the graph 100 shown in FIG. 5 could be presented through user interface 147. Furthermore, the computer 33 and the overall quantification processing system may be located with a user such as a mortgage company. In this embodiment, the Web server or cell radio 131 and the Web server 143 may be replaced by the computer 33 that also functions as a Web server to receive the signals from the sensors or detectors 122 and to deliver data and information to users and other interested entities. Such a computer 33 may take the form of a server anywhere on the network 92 shown in FIG. 4. In still another embodiment, the programmable microcontroller 128, the Web server or cell radio 131, the Web server 143, and the client interface 146, may be replaced by a single device or combination of devices located at the building of the mortgagee.

The system 10 shown in FIG. 7 may be generalized as including three main parts designated as the front end 148, the quantification processing system 149, and the back end 150 that includes one or more applications that interface with the quantification processing system 149. This generalization also applies to the other figures. For example, referring back to FIG. 1, the front end 148 has been designated by a dashed rectangle surrounding elements of the front end. The quantification processing system 149 and the back end 150 with its applications are likewise enclosed by respective dashed rectangles in FIG. 1.

One of the benefits provided by the system 10 is the automation of applying at least a portion of the savings to a financial transaction according to the instructions under control of a processor in the computer 33. In particular, the system 10 enables applying at least a portion of the savings to one or more of repayment of a loan, investment in a securities exchange commodity, and a request for credits. Another benefit provided by the system 10, is that a plurality of utilities may be monitored, and a plurality of signals from respective sensors or detectors may be received and processed by a single application to determine increased utility savings.

In one embodiment, the analysis module 18 of FIG. 1 or elements corresponding to the analysis module in embodiments of FIGS. 2-7 convert the utility savings into a common energy unit which may be uniquely created or may be a well known unit. For example, British Thermal Units (BTUs) may be converted to Kilowatt-hours. Based on the market value of energy, the energy savings can be converted to a monetary value.

In another embodiment, the system 10 provides a centralized application that processes data for many types of energy and utilities. The centralized application determines utility savings for all of the utilities being monitored, establishes a common energy unit, and quantifies the value of the savings in dollars of other monetary terms. This quantification makes the application of the present invention flexible for ease of interfacing with a wide variety of interested entities and their conventional applications.

The benefit of a common unit is that, for example a loan reduction can be expressed in a single common energy unit and/or a single common monetary unit. The same applies when the savings is applied to other financial transactions. Tax credits and other incentives for carbon emissions or energy savings can also be standardized to the same common energy or monetary units. In the example of a mortgage, this enables a consumer or borrower to easily obtain a reduced balance/recast of the loan balance or to increased principal payments.

In another example, once the tax credits or other incentives have been converted to a common unit they can be treated much like a land conservation easement credit in which the mortgagee has options. The options include trading the credit on the open market, which would be useful for those that cannot otherwise use the credit due to retirement, foreign national status, or because of little or no tax liability. Another of the options is to amortize the credit over a period of years. In association with paying down a mortgage, this example could be used to offset the energy savings differential that the borrower would have to pay monthly. For instance, with a $5000 credit amortized over two years, the monthly payment would be $208.33. This credit could be escrowed and the escrow account would be used to cover a payment differential so that the mortgagee could reduce his or her monthly payment by 208.33. Alternatively, the mortgagee could receive the full credit to pay down the mortgage balance.

By adding credits or other incentive values to the utility savings, an effectual energy savings can be determined that is more accurate and beneficial than simply taking into account the utility savings by themselves. Furthermore, with the EQS 10 in accordance with embodiments of the present invention, all the savings, credits, and other incentives available to green construction projects can be identified, correlated, quantified, bundled, and applied automatically in a consistent and reliable manner. The effectual energy saving that is thus determined is particularly valuable to large financial institutions that issue a volume of loans that is sufficient to enable them to collect and trade carbon credits and other incentives that are not readily available to the individual mortgagee, for example.

For developers, and perhaps for financial institutions and others, renewable energy credits (RECs) that are quantified by the system 10 may be used to offset infrastructure costs and to effectually reduce construction loan costs. Developers may utilize another incentive in the form of a municipal bond as collateral to obtain construction loans. Most states allow electricity providers to satisfy their compliance requirements through the purchase of RECs independent of the purchase of electricity. Thus, RECs are also a tradable commodity.

Developers, mortgage companies, and even mortgagees involved in building energy generation systems in their green construction projects may act as their own energy companies. As such, they can sell excess energy produced back to the utility companies. The excess or net increase in energy is also quantified by the system 10 and may be referred to as utility spread credits. In some communities, there can be a centralized power generation system, and a distributed power generation system (e.g., wind and/or solar energy for qualified regions) for each building to carry additional loads. These distributed energy systems reduce the energy that is needed from the centralized power generation systems or utility companies.

Embodiments of the EQS 10 utilizing the extensive database are very valuable for large commercial or financial sector clients. These embodiments of the system 10 enable extensive modeling including models that illustrate centralized power cost outlays and utility spread calculations for breakeven and/or profit potential estimations for small or large geographical areas, and for selected parties of interest. For example, financial institutions can utilize the system 10 to determine carbon credit trading potential on buildings they have financed by region. The EQS 10 can quantify the carbon load reduction for each individual building, and calculate the total load saved per region for trading purposes. EQS 10 can also calculate the potential, per region, in its database modeling embodiment. Because of the drive toward energy conservation, production, and green construction, utilization of the system 10 will result in greater market shares and increased income for the financial institutions using it. The system 10 also facilitates provision and distribution of new green mortgage products. This is due to the capability of the system 10 to include new and existing incentives automatically, which enables better loan terms. However, one of the most important benefits that come from utilizing the system 10, is that doing so will increase the rate of carbon reduction and benefit the environment.

In another example, utility companies can utilize the EQS 10 to determine the difference between the cost of utilities and the value of energy buy backs by a centralized utility company from the consumer or distributed utility company. This difference may be termed a "utility spread". Selling energy back to the utility company is another incentive for energy producers. Determining the utility spread enables distributed energy producers or utility companies to calculate the amount of energy they need to produce in order to break even in costs versus income, or to become renewable energy producers such as for putting more energy back in the grid than they remove, which may be termed "net metering". In any case, the distributed energy production helps to absorb infrastructure costs for building green. This has the advantage of producing clean energy. Additionally, centralized utility companies may buy back this clean energy from distributed energy producers and meet governmental mandates for 30% renewable energy increases by region. Thus, one of the advantages of the EQS 10, is that it facilitates centralized power generation capability using distributed renewable energy production. Part of the incentives may include RECs, and the EQS 10 can also quantify the RECs potential. All of these incentives and energy savings can be modeled utilizing the database embodiment of the EQS 10.

Other green incentives include carbon credits and other incentives from governmental agencies, such as municipal bonds. The potential overall value for a party of interest can be quantified and/or modeled by the EQS 10. Thus, the potential for absorption of infrastructure costs can be determined and illustrated. The EQS 10 also facilitates determining whether government agencies, utility companies, and developers are on schedule to meet timelines for mandated upgrades and energy reduction requirements. In fact, EQS 10 can layout blueprints or illustrations for entire cities. Such illustrations may include calculations or estimates for carbon trading potential and infrastructure costs for green energy systems. The EQS 10 can also model performance abilities by city, state, nation, and/or region for centralized renewable power for any of a variety of performance measures which may be undertaken.

In any case, the system 10 is a powerful tool that clearly quantifies utility usage and energy savings (including effectual energy savings) in terms that are definite and readily understood by all interested parties. A mortgagee, for example, may use this tool to obtain verification of energy savings or energy production data received from the utility companies. In fact, the data obtained through the current energy quantification system 10 may be sent back to the utility companies as indicated by arrows going to and from the power company 110 in FIG. 7, especially when the mortgagee is a net energy producer. Furthermore, the system 10 can be used to determine the efficiency of energy saving or energy producing systems that have not been previously tested. Because of the universal compatibility and the power of the system 10 as a universal tool, all or part of the system 10 may become an industry standard.

Figure 8:
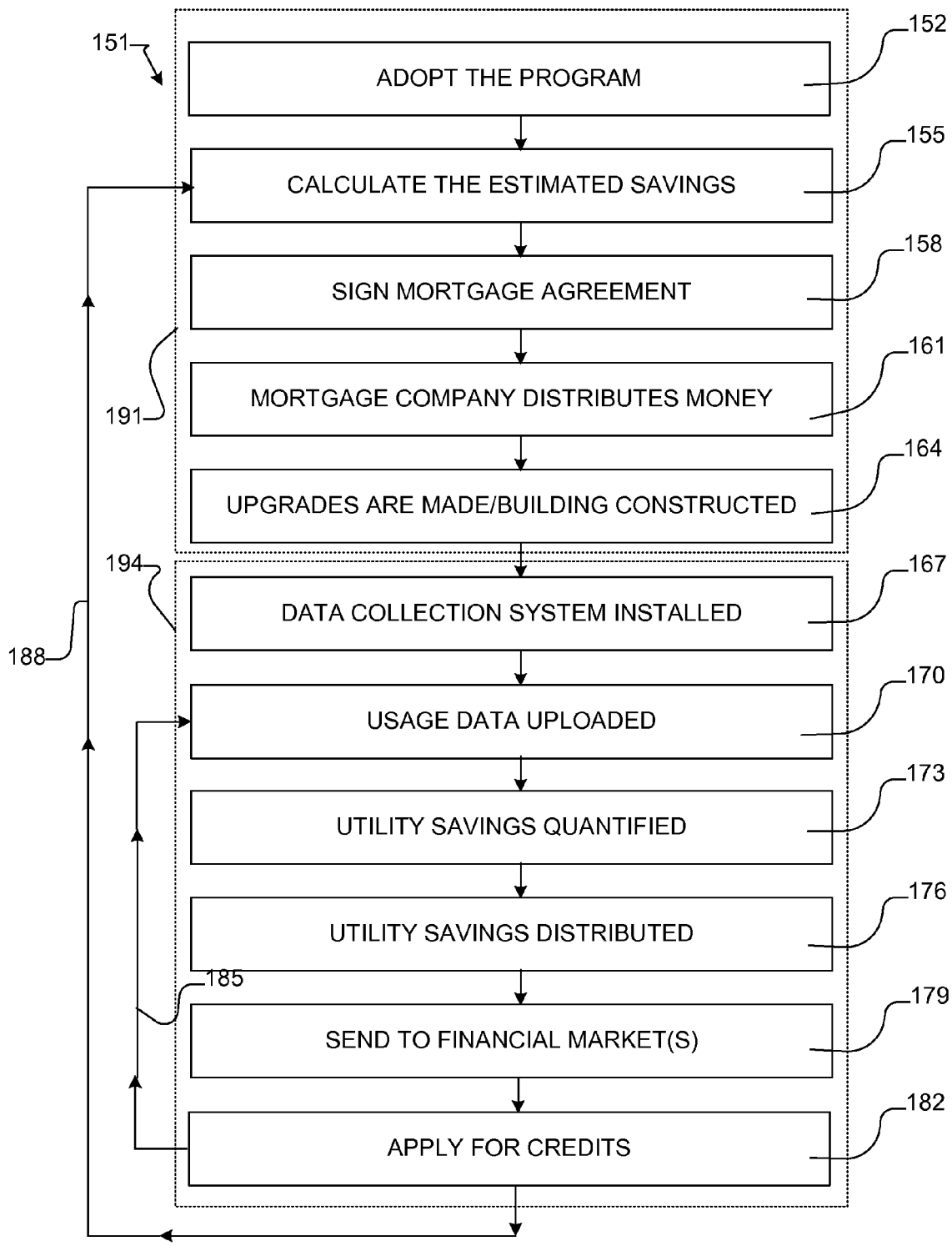
FIG. 8 is a block diagram representing a method of marketing with the system and methods of the present invention.

In another embodiment depicted in the flow diagram of FIG. 8, the system and method are usable by a mortgage or other company as a method of marketing 151, and may be licensed to multiple mortgage companies, for example. In this aspect of the method, a mortgage company adopts the program as indicated at 152. Among other reasons, adopting the program will facilitate a mortgage company's entry and/or further penetration into the green/sustainable energy building and utilities markets.

Because of trends in the housing and construction markets, it is likely that the green market will be increasingly important. This is true, at least in part, because interest rates are likely to go up, resulting in more refinancing. Green energy construction in the form of improved efficiency retrofits and remodels with energy production systems fits well with refinancing and second mortgage financing. Remodeling with more energy efficient features or energy producing features also adds to the capital value of the subject buildings. Therefore, the risk in making the loan is reduced. Furthermore, energy and money are conserved. Due to the clarity and assurances provided by the quantification made possible by the embodiments of the present invention, green energy upgrades will increasingly become good candidates for financing. Green energy upgrades will provide the additional opportunity to gain back the expended money as well as increase the value of the buildings. Furthermore, laws are being enacted to raise the bar and require certain minimal standards of energy conservation and to reward for participation in specific energy saving and energy producing construction. Therefore, individuals and companies will tend away from the typical deferred maintenance and will upgrade their buildings with green or sustainable energy improvements. Many of the benefits and reasons for remodeling also apply to new building projects, and individuals and companies will choose to build new structures having green or sustainable energy features more and more over time.

As shown in FIG. 8, the mortgage company calculates estimated savings, as indicated at 155. This may be accomplished by the quantification systems and methods described above, and/or the estimated saving may be made available to the mortgage company through a provider of the current systems and methods. Once the estimated savings have been quantified, the mortgagee will be able to clearly see the benefits and be assured of a return on the investment. Thus, the mortgagee will want to sign the mortgage agreement as indicated at 158. This step forms a contractual agreement in which the mortgagee authorizes the mortgage company to withdraw or otherwise obtain money equal to at least a portion of the estimated savings and apply the money to early payment of the mortgage loan. The portion may be in terms of a percentage, or may be a set amount. Other portions of the savings may be applied to investments, as has been described above, which may also be agreed upon by contract. The mortgagee, or the system on behalf of the mortgagee, may also apply for credits. Alternatively, the system may apply for credits on behalf of the lender or mortgage company in exchange for better terms on the loan. The mortgage will be configured similar to a construction loan in which the mortgage company distributes money in payment to the contractors and for materials, as indicated at 161. The upgrades are made, as indicated at 164.

Once the upgrades have been made, the mortgage loan can be converted to or replaced by a long-term mortgage loan. The data collection system or front end of the utility savings determination and application system is installed, as indicated at 167. Alternatively, the front end may refer to the end having the user interface, and the data collection system may be at the back end. The energy usage data is uploaded periodically and/or continuously, as indicated at 170. This data is converted to a common unit and quantified for ready access by interested entities. The quantification system analyzes the usage data and compares it to the predetermined baseline(s) to quantify the savings, as indicated at 173, as described in the various embodiments herein. Money corresponding to the portion(s) of the energy savings is distributed in accordance with the agreement, as indicated at 176. For example, at least some of the money may be paid to the mortgage company and could simply be shown as a deposit to pay down the principle in the mortgage loan bill sent to the mortgagee. Alternatively or additionally, portion(s) of the savings may be applied to investment in securities, trading carbon credits as a commodity, and/or deposited in a savings account as indicated at 179. Further alternatively, at least a portion could be paid out in cash or deposited in a checking account of the mortgagee.

The value gained corresponds to at least a portion of the energy/utility savings, and whatever units are used to represent that value could be converted into carbon credits, municipal bonds, and/or other valuable commodities. Embodiments of the systems and methods of the present invention enable a mortgagee or mortgagor to actually create a utility company because the systems and methods enable individuals or companies to deal in carbon credits, renewable energy credits, and/or other commodities, and to become energy producers. For example, individuals and companies can sell carbon credits to utility and other companies. Also, by using the programs and methods of embodiments of the present invention, individuals and companies can also become providers of energy conservation and energy production systems.

Still further, the utility savings achieved and improvements made can be utilized to apply for tax credits or other incentive credits such as from the government, as indicated at 182. Other incentives may include tax deductions, rebates, and/or discounts. These are additional paybacks that could benefit the mortgagee directly, be applied to investments, be applied to early payment of the mortgage loan, and/or be recouped directly by the mortgagor in exchange for improved loan terms for the mortgagee. The systems and methods of embodiments of the present invention identify and facilitate application for and receipt of tax incentive credits, which may further reduce cost outlays and closing costs on loans, for example.

Once a mortgage company has adopted the program, the mortgage company may repeat the steps during the life of the mortgage with any given mortgagee, as indicated by the return arrows forming a closed loop 185. Also, the mortgage company may repeat the process with any number of additional mortgages and any number of mortgagees as indicated by the return arrows forming a closed loop 188. One or more of the steps may be omitted or additional steps may be added without limitation. For example, in one embodiment, one or more of the steps of calculating 155, signing 158, distributing loan money 161, and upgrading/building 164 may represent a method 191, which may be separate from a method 194 generally represented by one or more of the steps of installing 167, uploading 170, quantifying 173, and distributing savings 176. That is, the overall method 151 may be separately applied to each of qualifying individuals for green/sustainable energy loans, and making a financial transaction based on a utility savings for participants.

Figure 9:
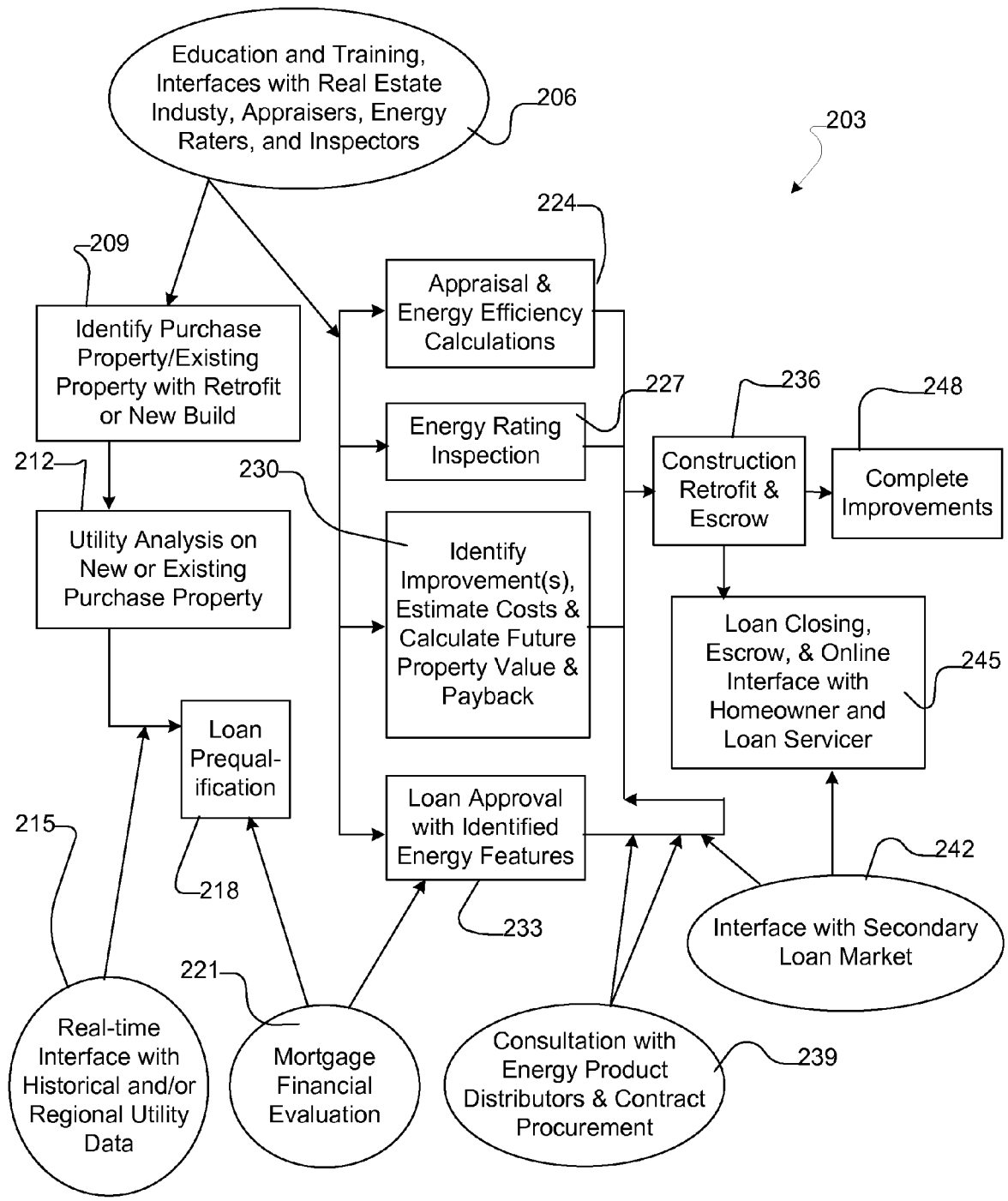
FIG. 9 is a flow diagram showing an embodiment of the method, including examples of interacting entities and possible sequences of steps in a new construction or retrofit construction loan process.

FIG. 9 is a flow diagram showing examples of interacting entities and possible sequences of steps in a new construction or retrofit construction loan process 203. The loan process may begin at an educational or training stage 206. In this education stage 206, appraisers, energy raters, inspectors, users from the real estate industry, and/or other users may receive in-person and/or on-line training regarding the EQS 10 and/or an accelerated community energy system for applying energy savings to a financial transaction such as a loan. These and other individuals and companies may be introduced to additional resources that previously were not available or were challenging to access. Even if they could be accessed, doing so required piecing the resources together from multiple sources and still not being able to do so effectively to gain the confidence of lenders to support green/sustainable energy projects to a satisfactory level. Thus, the systems and methods described herein provide a one-stop resource that previously was not available and is an excellent marketing tool. For example, users may want to consider the effects of green features or sustainable features in new or retrofit building projects. As such, the user identifies the purchase property or existing property to be supplied with the green and/or sustainable features, as indicated at 209. Once the property has been identified, the utility and energy usage is analyzed 212. At this point, the system may interface in real-time with utility data, or at least with the most current historical and/or utility data, as indicated at 215. The user may be prequalified for a conventional loan 218. This prequalification typically requires an interface with, and evaluation by, a mortgage company or other lender 221. In one embodiment, the prequalification may be based at least in part on a predicted energy savings.

Also shown in FIG. 9, the user may want to alternatively or additionally get an appraisal for the property based on energy efficiency calculations of green and/or sustainable energy features 224. The calculations indicate the amount of savings over time that can be expected by having the features in the property. That is, the added energy saving and producing features add value, which can be factored in by the appraiser. This may be undertaken at any time. However, the training 206 encourages finding out how the user can save energy, such that getting the energy efficient appraisal 224 would be a natural next step after the training 206. Another natural sequence would be to get the appraisal 224 after being prequalified 218. Another step for finding out ways to improve energy savings is to get an energy rating inspection 227 by a specialist that is qualified to identify the best ways to reduce energy waste and/or what sustainable features would work best for a particular property. Based on at least one of analyzing historical/utility data 215, performing the energy efficiency analysis and getting the appraisal 224, and getting the energy rating inspection 227, the process 203 or system identifies improvements 230 that can be made to the new or existing property. In this step 230, costs for the improvements and future property values and paybacks are calculated, including any incentive values that are available. These calculations enable approval of a loan 233 having improved terms based on the energy savings, money savings, and/or incentive credits that will be realized with the green and/or sustainable energy features that have been identified and agreed upon. As with the prequalification 218, a mortgage financial evaluation 221 is performed by a qualified mortgage company or lender.

FIG. 9 also shows that after the stage in which one or more of appraisal 224, inspection 227, improvement identification 230, and loan approval 233 is achieved, the user can move toward actual construction and start of escrow 236 of a new building or retrofit based on the identified energy improvement features. The user may enlist the services of one or more of energy product distributors 239 and/or contractors for installation and construction. In the case of a retrofit construction, the user may interface with a secondary loan market 242 in order to obtain the loan. In any case, the mortgage company or other qualified lender helps to set up escrow and closing for the loan, as indicated at 245. This may be achieved by communication on-line between the property owner and the lender. Finally, the green and/or sustainable energy improvements are completed 248.

Figure 10:
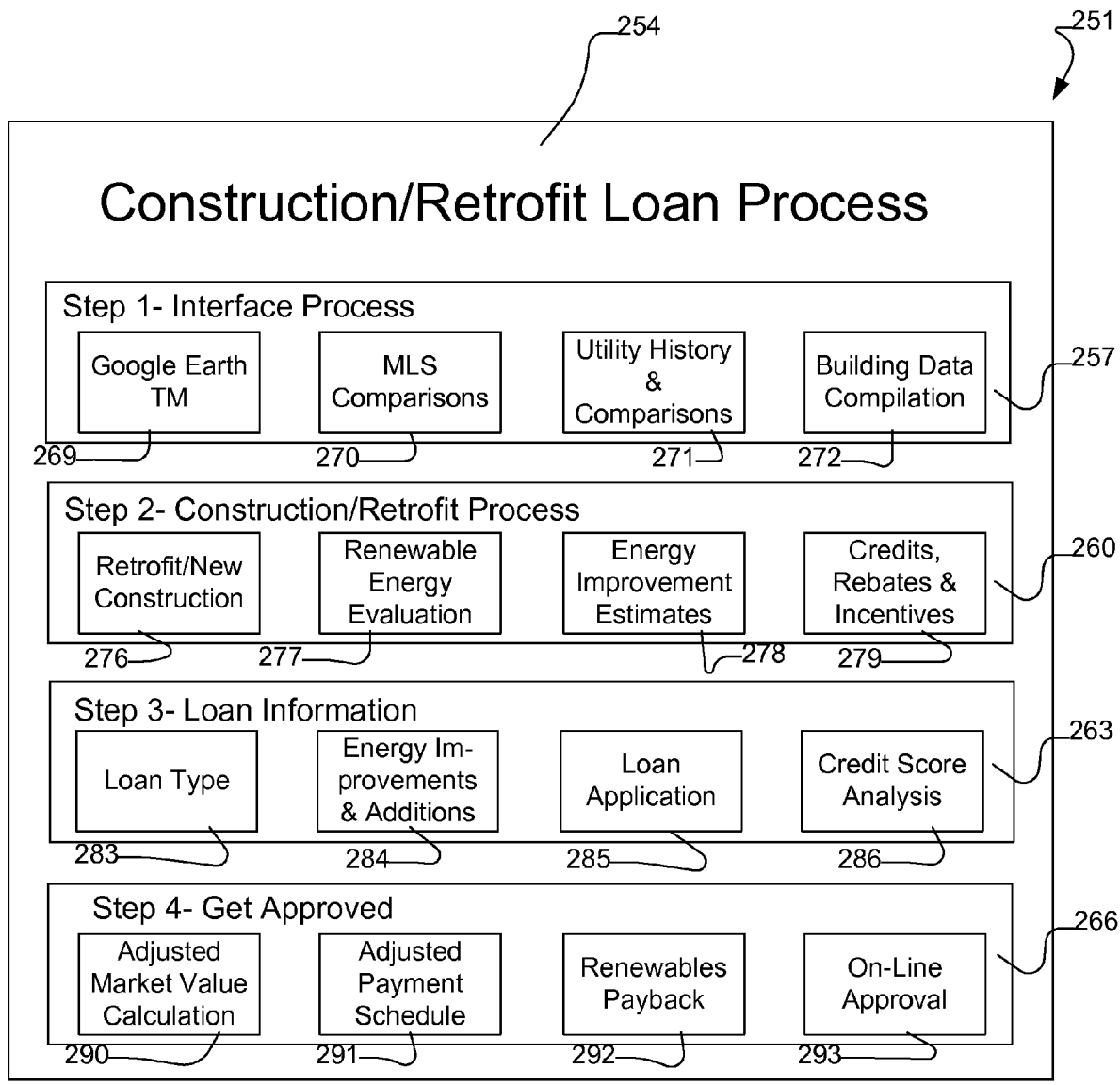
FIG. 10 is an example diagrammatic view depicting a user interface presenting the new construction/retrofit construction loan process with selectable options.

FIG. 10 is an example diagrammatic view depicting a user interface 251 that may be used to present the new construction/retrofit construction loan process with selectable options. The interface 251 may be in the form of a screen display having clickable soft buttons on a computer screen 254, for example. Each of these soft buttons may be associated with a module that performs the functions of the respective soft buttons. The user interface 251 does not necessarily depict all the same elements or flow paths for the loan process as are shown in FIG. 9 even though the user interface 251 is compatible with the process shown in FIG. 9. Rather, the user interface divides the loan process up into four main steps including an interface process 257, a construction/retrofit process 260, a loan information step 263, and an approval step 266.

The interface process presents a user with clickable soft buttons including Google Earth™ 269, the multiple listing service (MLS) 270, and one or more databases. The interface process 257 shown in FIG. 10 includes a clickable link to utility history and comparisons 271 for utility usage in similar properties and/or constructions and a compilation of building data 272. With the soft buttons of the interface step 257, the user can look at a neighborhood through digital images on Google Earth™, compare pricing and other information through the MLS, and collect and analyze data from utility and building databases with the aid of the systems and methods of embodiments of the present invention. Additionally or alternatively, the interface step may include soft button links to regional climate databases and building construction databases to factor in climate and materials factors that affect energy savings, for example.

By clicking on the link 272 for compilation of building data, the user may be presented with a questionnaire that prompts the user to answer questions by filling spaces or checking boxes. Alternatively, the soft buttons may include a button for assessing energy usage factors. Upon clicking such a link the user may be presented with a questionnaire addressing several categories of energy usage factors. One of the categories may be the building shell with fillable cells for: building type (commercial, residential, mixed use); size of building (square feet by floor), construction material (including thickness); number of floors; roof type; number, type, and orientation of doors; number, type, and orientation of windows; garage, building orientation; foundation type, insulation type-wall; insulation type-roof; insulation type-floor; and window sizes/types (R-U value) and orientation. Another category for energy factors may be climate zone with fillable cells for: latitude/longitude; altitude; daily high temperature; daily low temperature; daily average temperature; percent change from previous day; and average daily relative humidity. Another category may be HVAC and appliance with fillable cells for: type of heating system (BTU/kWh/Energy rating); type of cooling system (BTU/kWh/Energy rating); water heater type (BTU/kWh/Energy rating); and major appliances (kWh/Energy rating). Another category may be renewable energy sources with fillable cells for: solar electrical generation (type, output); solar water heating (capacity); geothermal (capacity); wind generator (type, output); and other (type, output, capacity). Another category may be major appliance with fillable cells for: refrigerator (BTU/kWh/Energy rating); stove (BTU/kWh/Energy rating); room air conditioner (BTU/kWh/Energy rating); televisions and computers (kWh/Energy rating); and other (BTU/kWh/Energy rating). Another category may be occupancy information with fillable cells for: number of inhabitants; and age group of the inhabitants (0-5, 6-11, 12-18, 18-25, 25-60, 60+). Another category may be utility information with fillable cells for: identify local utility companies; determine net-metering capability; average daily utility price (electricity/natural gas); and averaged comparables (conventional building energy use). The averaging of comparables may be achieved automatically based on selected comparable properties.

The entries prompted for, by the interface process 157 are needed for estimating energy usage and/or energy savings. This is a part of quantification, at least for qualifying for loans. An example of data with which the input is to be populated is the climate data. Initially, the relational database may have limited information. However, over time, this data may be added to the database. Another area is the HVAC and appliances, data for which the relational database may be supplied from manufacturers. Similarly, data from renewable energy sources can be included in the database. Data for these and other inputs such as tax credits, carbon credits, and other incentives may be drawn from a myriad of sources to enable accurate quantification estimates for usage and savings.

The construction/retrofit process 260 also has clickable links including retrofit/new construction selection link 276, renewable energy evaluation link 277, energy improvement estimates link 278, and credits, rebates, and incentives 279. These links enable a user to select options that best fit the existing property or new building. The system analyzes the options selected in order to return results. For example, the user may select retrofit in link 276 and particulars for which the system prompts the user in the link 277. Link 278 is used to get estimates of costs for installing improvements. Link 279 may connect to stored information on various credits, rebates, and incentives, and the system may have instructions indicating which of the credits, rebates and incentives are available for a particular property and/or entity in a particular region, state, or country in which they are available.

After a user has elected through the aid of the system and user interface 251 the kind of construction 260, the system determines all the savings and/or incentive credits that are available and bundles or correlates them for further evaluation in the loan information step 263. The systems and methods identify the most affordable, highest performance, and most efficient green and sustainable energy technologies. Thus, the systems and methods identify good installations options for energy efficiency upgrades, justify those options, and ultimately capture associated capital investment gains. This bundling is region specific since incentives and rebates are specific to cities, counties, states, and countries. Bundling is also dependent on climate and other energy usage factors. Thus, the data is selected based on these and other specifics entered by the user. Based on the calculated information, the system allows the user to select the loan type through clickable link 283. The energy improvements are listed and can be modified such as by adding green or sustainable energy features through link 284. The user can click the loan application link 285 and fill in the loan application on-line, or at least print out a copy of the application for mailing or hand delivery. As part of the loan application step, or as a separate feature, a link 285 enables the user to run a credit check on-line through link 286.

Once the loan information step 263 has been completed, the user moves to the step of getting the loan approved 266. This step has several possible sub-steps including calculating the adjusted market value by clicking the link 290. The increased market value achieved through the green and/or sustainable energy features increases the property value, which in turn enables improved loan terms. Once quantified, this increased market value can also translate into higher loan amounts since the property value is increased and payments may be reduced by the improved terms. The user may look at an adjusted payment schedule based on applying saving and/or incentives to early payoff of the loan by clicking link 291. The renewable energy payback link 292 shows savings and/or credits caused by the green and/or sustainable improvements. Clicking these links may initiate calculations, may pull up graphics, and/or present text representing calculations and analysis of energy savings and/or production. Once the benefits have been considered, the user may click the link 293 to initiate on-line approval of the loan. Clicking the on-line approval link 293 may cause the terms of the loan to be presented to the user for approval and lock in. Thus, most if not all of the loan process for green and/or sustainable energy improvement constructions can be done on-line in a seamless automated system. The information that has been input and the information coming from the analysis are stored in a user and/or property profile for subsequent use and/or update.

Figure 11:
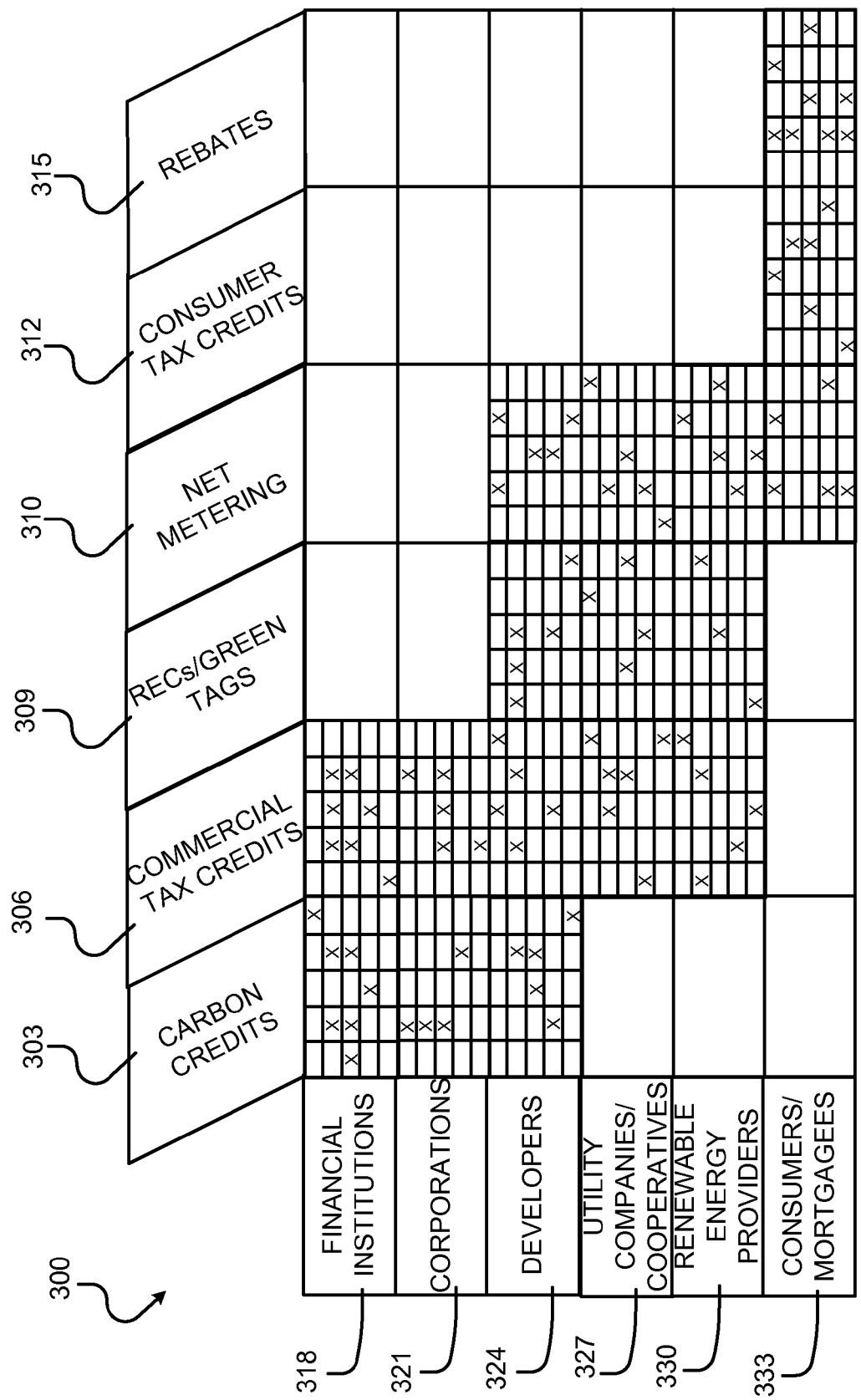
FIG. 11 is a comparison graph showing various green incentive and various parties of interest that will benefit from the green incentives.

FIG. 11 is a comparison graph 300 illustrating types of green incentives in the columns and types of parties of interest in the rows. This graph 300 illustrates bundling of incentives for a particular party of interest. For example, within each category of parties of interest, the graph 300 shows five rows corresponding to specific parties of interest. The checked boxes in each row are the incentives that are available and can be bundled for the maximum financial benefit of that particular party of interest. Referring back to FIGS. 1 and 4, the correlation module 29 can correlate all of the available incentives with all of the green construction projects or can correlate all of the available incentives for a particular party of interest and/or for a particular project. The result of this correlation is a matching of all available incentives, as represented by all of the checked boxes in FIG. 11. The bundling module 31 groups the green incentives for the particular party of interest so that they can readily understand the effectual savings that includes the value of the incentives. This bundling is represented by the checked boxes in each of the rows of FIG. 11.

Across the top of the comparison graph 300 in FIG. 11, the columns are labeled with the types of incentives including Carbon Credits 303, Commercial Tax Credits 306, Renewable Energy Credits (RECs/Green Tags) 309, Net Metering 310, Consumer Tax Credits 312, and Rebates 315. Along the left side, the rows are labeled with the categories of parties of interest including Financial Institutions 318, Corporations 321, Developers 324, Utility Companies/Cooperative Utilities 327, Renewable Energy Providers 330, and Consumers/Mortgagees 333. Different incentives are available to different interested parties within these categories depending on the type of entity of the party and the specifics of the carbon reduction and energy conservation/renewable energy production in which the party of interest is involved. Federal and other tax credits are available to consumers as well as to businesses. Thus, these incentives have been broken into consumer tax credits 312 and commercial tax credits 306, respectively.

Larger entities such as large financial institutions 318 and other large corporations 321 can benefit from carbon credits 303 that can be collected for an entire state or region, for example. A trading mechanism is derived from the regional presence of some financial institutions. The EQS 10 provides the quantification and bundling of incentives that facilitates use of the regionally based trading mechanism for a particular party of interest. That is, the EQS 10 opens the door for these large financial institutions because of their regional lending capacity and their ability to benefit from carbon credits on a regional basis to obtain the tradable credits, for example. These financial institutions can then offer lower interest rates to consumers and higher returns for their investors/secondary markets. Some of the costs to the financial institutions may also be tax deductible, further improving their profitability. Similarly, developers 324 can take advantage of RECs 309 based on an entire region to offset infrastructure costs for increasing renewable energy production capacity through green construction projects.

Corporations benefit from trading mechanisms derived by upgrading existing buildings and reducing carbon emissions. Corporations, trade centers, shopping malls, universities, condominium communities, and other entities with very large buildings and other large energy using facilities can benefit from energy savings improvements directly and indirectly from carbon credits and/or renewable energy credits earned through implementing the improvements. The effectual savings offset or absorb cost outlays made for the improvements.

For developers 324, trading mechanisms are derived from carbon reduction programs and the utility spreads. A utility spread is the difference between buying and selling prices of energy for renewable energy producers. The trading mechanisms may, in part, be derived from municipal bond capitalization for construction of green infrastructure. While quantification of actual energy savings through the EQS 10 forms a foundation for any green project, incentives benefits may be overlaid where applicable for an effectual energy savings value. For example, large developments can benefit greatly from aggregating carbon credits and renewable energy credits to the actual energy savings. Where the green construction projects of the developer include renewable energy, the developer can benefit from net metering or selling renewable energy. One or more of the carbon credits 303, RECs 309, and net metering 310 can be securitized and act as collateral for municipal bond loans from municipalities. As with other parties of interest, the EQS 10 can perform cost/benefit analysis with calculations and modeling in the qualification process for construction and/or municipal bond loans. Developers 324 can also build communities having centralized power generation (CPG) facilities that produce renewable energy. Thus, each development can become its own energy provider.

Utility companies 327 that include centralized and/or distributed energy generation, and other renewable energy producers 330 can take advantage of the incentive of selling energy to less green utility companies. Less green utility companies are required to provide a predetermined percentage of their energy as renewable energy, thus requiring them to buy the renewable energy from green energy producers. Although utility spreads for these renewable energy producers must be taken into account, and the selling price is generally limited to less than the purchase price, these renewable energy producers have a level of energy independence and a sellable commodity with which they can absorb partial costs, break even, or make profits. The EQS 10 database may have a customer database for identification of renewable energy sellers. The subcolumns in the net metering 310 category may represent specific energies or utilities that can be sold to a less green utility company. These specific energies and utilities may include one or more utilities of types including electricity, gas, water, and other utilities. In any case, utility companies and/or cooperatives, renewable energy providers, and developers that produce renewable energy in effect perform the function of utility companies and can claim the benefit of RECs. The incentive of RECs can offset infrastructure and equipment costs for upgrading or building green. These can be quantified locally, by state, and/or regionally, and a cost analysis can be performed by the EQS 10.

In one model, a community may form a centralized power generation (CPG) and distribution facility for the community. The EQS 10 is capable of modeling community energy provider potential and redistribution potential. All city government buildings, residences and businesses may be powered by the CPG. The CPG may have a capacity for producing an amount of renewable energy greater than is needed in the community. Thus, the CPG may distribute energy to nearby communities that do not have renewable energy production capability. This model may be applied to design and construction of whole cities, and EQS 10 can provide grid blue prints and cost analysis for such cities.

Consumers or mortgagees 333 may take advantage of a plurality of available consumer tax incentives 315 and rebates 318. These credits may be applied to mortgage cost reduction, mortgage acceleration by payments over time, and/or paying down the mortgage balance in lump sums, as described herein. This offsets the cost of equipment and energy upgrades for the consumer or mortgagee 333.

There are a wide variety of local, state, and national tax credits (including tax deductions) available to the several parties of interest. The EQS 10 is a practical tool for accessing the trading mechanisms that these incentives create. Thus, the EQS 10 makes upgrading existing buildings, reducing carbon emissions, and otherwise building green a real and practical option.

It is to be understood that the graph 300 of FIG. 11 is an example and is not to be limiting. Future carbon reduction programs may provide additional incentives aimed at offsetting development costs. An example of an incentive not shown in the comparison graph 300 of FIG. 11 is municipal bonds that can be used by developers to obtain capital for green infrastructure.

The present invention may be embodied in other specific forms without departing from its spirit or essential characteristics. In fact, the embodiments or portions thereof may be combined in any way. The described embodiments are to be considered in all respects only as illustrative and not restrictive. The scope of embodiments of the invention is, therefore, indicated by the appended claims rather than by the foregoing description. All changes which come within the meaning and range of equivalency of the claims are to be embraced within their scope.

What is claimed is:

1. An apparatus for determining incentives for green transactions, the apparatus comprising:
   a processor;
   a computer readable storage medium comprising:
   a bundling module configured to determine a plurality of green incentives that apply to a mortgagee for an identified property, the identified property comprising a new building, the plurality of green incentives being from a group of green incentives, the mortgagee owning the identified property;
   an analysis module configured to quantify a plurality of respective values of the plurality of green incentives from the group of green incentives;
   the bundling module further configured to bundle the respective values that have been quantified according to the mortgagee; and
   an execution module configured to interface with a mortgagor to automatically apply at least a portion of the bundled respective values as one or more monetary credits to repayment of a mortgage loan for the new building on behalf of the mortgagee, the mortgage loan held by the mortgagor;
   wherein the bundling module, the analysis module, and the execution module are executed by the processor.

2. The apparatus of claim 1, further comprising a plurality of parties of interest including mortgagee, wherein:
   the parties of interest are from the group consisting of financial institutions, developers, utility companies, and building owners associated with a plurality of green construction projects including at least one green construction project;
   the bundling module is configured to determine at least one green incentive that applies to each party of interest and group accompanying values for each determined green incentive according to the respective parties of interest, wherein different incentives are available to different parties of interest; and
   the execution module is configured to apply the values of the green incentives to financial transactions involving the parties of interest.

3. The apparatus of claim 1, wherein the identified property comprises a property associated with a retrofit construction, the identified property being subject to an existing mortgage prior to the retrofit construction, and wherein automatically applying at least a portion of the bundled respective values comprises automatically applying at least a portion of the bundled respective values to repayment of the existing mortgage loan for the property associated with the retrofit construction on behalf of the mortgagee.

4. The apparatus of claim 1, further comprising a correlation module configured to correlate the at least one green incentive to a plurality of green construction projects.

5. The apparatus of claim 4, wherein:
   the correlation module is configured to selectively combine a plurality of the green incentives into a package; and
   the bundling module is configured to combine a plurality of packages including the package into a bundle associated with the mortgagee based on at least one of retrofit construction and new building construction that involves at least one of sustainable features and green features.

6. The apparatus of claim 5, wherein:
   the correlation module is configured to correlate all green incentives that are available to the plurality of green construction projects, the green incentives being from the group consisting of national tax credits, national tax deductions, state tax credits, state tax deductions, local tax credits, local tax deductions, municipal bonds, utility company buy backs, carbon credits, and renewable energy credits; and the analysis module is configured to quantify a value of each of the green incentives that is available.

7. The apparatus of claim 1, wherein:

the execution module is configured to apply for the green incentive to at least one of a national government, state government, local government, carbon credit securities agency, and utility company;

the execution module further comprising a forms module that accesses at least one form with which to apply for the green incentive; and the forms module accesses a plurality of forms corresponding to a respective plurality of recipients, the forms module configured to automatically fill in at least a portion of the forms.

8. The apparatus of claim 1, further comprising a securities exchange module configured to apply for carbon credits based on carbon emissions reduction.

9. The apparatus of claim 1, further comprising a securities exchange module configured to enable purchase and sell of at least one of carbon credits, energy conserving incentive values, and energy generating incentive values.

10. The apparatus of claim 1, wherein:

the analysis module is configured to determine a baseline value and compare a usage of at least one utility to the baseline value and calculate an energy savings;

the analysis module adds the value of the at least one green incentive to the energy savings for an effectual energy savings value; and the execution module is configured to apply at least a portion of the effectual energy savings value to the mortgage loan.

11. The apparatus of claim 10, wherein the execution module applies the portion of the effectual energy savings to a plurality of payments from an escrow account.

12. The apparatus of claim 1, wherein at least one of the modules is configured to convert the value of the green incentive and a unit of usage for a utility into a single common unit of at least one of energy and currency.

13. The apparatus of claim 1, wherein:

the analysis module further comprises a modeling module configured to model reduced financial risk due to green incentive values in the model; and the modeling module configured to illustrate an effectual energy savings to facilitate capital funding for at least one of retrofit construction and new build construction that includes at least one of sustainable features and green features;

wherein the modeling module illustrates cost outlays and utility spreads for at least one of break even and profit potential models.

14. The apparatus of claim 13, wherein the modeling module quantifies a carbon load reduction for each of a plurality of buildings and calculates a total carbon load savings for the plurality of buildings.

15. The apparatus of claim 14, wherein the total carbon load savings is an estimate to determine a potential savings in a predetermined region.

16. The apparatus of claim 1, further comprising a mortgagor module including at least a portion of one of the analysis module and the execution module, the mortgagor module configured for setting terms of a loan and applying at least a portion of the value of the green incentive to repayment of the loan.

17. The apparatus of claim 1, further comprising a tax incentives module configured to identify, quantify, and apply for at least one tax incentive from among the green incentives.

18. The apparatus of claim 1, wherein the apparatus is an article of manufacture comprising the computer program storage medium readable storing computer readable program code executable by the processor to perform a method for determining at least one green incentive and applying at least a portion of the green incentive to a financial transaction, the method comprising:

determining the at least one green incentive according to the instructions; and applying at least a portion of a value of the green incentive to a financial transaction.

19. The apparatus of claim 1, further comprising:

a metering module configured to receive signals representing usage of one or more of energy, temperature, flow, current, volume, and mass of at least one utility;

the analysis module configured to predetermine a baseline value and compare usage of the at least one utility to the predetermined value and determine a savings of energy; and the execution module configured to apply at least a portion of the savings to the mortgage loan.

20. The apparatus of claim 19, further comprising at least one sensor operatively connected to the metering module for detecting usage of at least one of the energy, temperature, flow, current, volume, and mass of the at least one utility.

21. The apparatus of claim 1, further comprising:

the analysis module configured to predetermine a baseline value of energy usage for a conventional energy building;

the analysis module configured to:

quantify at least one of an actual energy usage and a predicted energy usage for at least one of a green energy building and a sustainable energy building;

compare the at least one of the actual and the predicted energy usage to the predetermined baseline value; and determine a savings of energy; and the execution module configured to save at least one of the base line value, actual energy usage, predicted energy usage, and energy savings to a database.

22. The apparatus of claim 1, further comprising an article of manufacture comprising the computer program storage medium readable by the processor and embodying one or more instructions executable by the processor to perform a method for determining an energy savings and applying at least a portion of the savings to a financial transaction, the method comprising:

automatically quantifying an energy savings according to the instructions; and applying at least a portion of the energy savings to a financial transaction.

23. The apparatus of claim 1, wherein automatically applying at least a portion of the bundled respective values, as one or more monetary credits, repayment of the mortgage loan further comprises communicating one or more of the bundled respective values and the one or more monetary credits directly to a financial entity managing the mortgage loan.

24. A method of quantifying a green incentive and applying the green incentive to a financial transaction, the method comprising:

automatically determining, by a processor a plurality of green incentives that apply to a mortgagee for an identified property, the identified property comprising a new building, the plurality of green incentives being from a group of green incentives, the mortgagee owning the identified property;

automatically quantifying, by the processor, a plurality of respective values of the plurality of green incentives from the group of green incentives;

automatically bundling, by the processor, the respective values of the plurality of green incentives that have been quantified, wherein bundling the values is specific to the mortgagee; and automatically interfacing with a mortgagor and applying at least a portion of the bundled respective values, as one or more monetary credits, to repayment of a mortgage loan for the new building and on behalf of the mortgagee, the mortgage loan held by the mortgagor.

25. The method of claim 24, further comprising a plurality of parties of interest including the mortgagee, the method further comprising:

bundling the values according to the respective parties of interest, wherein the parties of interest are associated with a plurality of green construction projects, the parties of interest being from the group consisting of financial institutions, developers, utility companies, and real property owners;

applying the values of the green incentives to financial transactions involving the parties of interest.

26. The method of claim 24, further comprising:

selectively combining a plurality of the green incentives into a package; and bundling a plurality of packages including the package into a bundle associated with the mortgagee based on at least one of retrofit construction and new building construction that involves at least one of sustainable features and green features.

27. The method of claim 24, further comprising:

quantifying an energy usage;

determining an effectual energy savings by comparing the energy usage to a predetermined baseline and adding a quantified value of the at least one green incentive.

28. The method of claim 24, further comprising automatically correlating the at least one green incentive to a plurality of green construction projects.

29. The method of claim 28, wherein:

automatically correlating further comprises correlating all green incentives that are available for the plurality of green construction projects, the green incentives being from the group consisting of national tax credits, national tax deductions, state tax credits, state tax deductions, local tax credits, local tax deductions, municipal bonds, utility company buy backs, carbon credits, and renewable energy credits;

wherein automatically quantifying further comprises quantifying a value of each of the green incentives that is available for each of the green construction projects.

30. The method of claim 28, wherein:

automatically correlating comprises receiving input through a user interface regarding the plurality of incentives;

the operation of receiving input comprises receiving input regarding the green incentives in at least one of a particular, city, state, country and region; and the operation of receiving input comprises receiving input under control of machine readable code physically embodied in storage media in a digital processing device.

31. The method of claim 24, further comprising applying for the green incentive to at least one of a national government, state government, local government, carbon credit securities agency, and utility company, wherein applying for the green incentive comprises accessing at least one form from among a plurality of forms and applying for the green incentive with the at least one form.

32. The method of claim 24, further comprising automatically charging a fee to at least one party of interest for using the method, wherein the party of interest is from the group consisting of financial institutions, developers, utility companies, and real property owners.

33. The method of claim 24, further comprising absorbing an infrastructure cost for the at least one green construction project by applying at least a portion of the value of the green incentive to payment of the infrastructure cost.

34. The method of claim 24, wherein automatically quantifying respective values of at least one green incentive comprises quantifying a value of a green incentive for a green feature on an automobile.

35. A method of quantifying a green incentive and applying the green incentive to a financial transaction, the method comprising:

automatically determining, by a processor, a plurality of green incentives that apply to a mortgagee for an identified property, the identified property comprising a property associated with a retrofit construction, the identified property being subject to an existing mortgage prior to the retrofit construction, the plurality of green incentives being from a group of green incentives, the mortgagee owning the identified property;

automatically quantifying, by the processor, a plurality of respective values of the plurality of green incentives from the group of green incentives;

automatically bundling, by the processor, the respective values of the plurality of green incentives that have been quantified, wherein bundling the values is specific to the mortgagee; and automatically interfacing with a mortgagor and applying at least a portion of the bundled respective values, as one or more monetary credits, to repayment of the existing mortgage loan for the property associated with the retrofit construction on behalf of the mortgagee, the mortgage loan held by the mortgagor.

* * * * *